US009482874B2

(12) United States Patent
Robinson et al.

(10) Patent No.: US 9,482,874 B2
(45) Date of Patent: *Nov. 1, 2016

(54) ENERGY EFFICIENT DIRECTIONAL FLAT ILLUMINATORS

(71) Applicant: RealD Inc., Beverly Hills, CA (US)

(72) Inventors: Michael G. Robinson, Boulder, CO (US); Graham J. Woodgate, Henley-on-Thames (GB); Jonathan Harrold, Leamington Spa (GB)

(73) Assignee: RealD Inc., Beverly Hills, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/339,271

(22) Filed: Jul. 23, 2014

(65) Prior Publication Data
US 2014/0333738 A1 Nov. 13, 2014

Related U.S. Application Data

(63) Continuation of application No. 13/300,293, filed on Nov. 18, 2011.

(60) Provisional application No. 61/415,810, filed on Nov. 19, 2010.

(51) Int. Cl.
F21V 7/04 (2006.01)
G02B 6/10 (2006.01)
(Continued)

(52) U.S. Cl.
CPC ............ *G02B 27/225* (2013.01); *G02B 6/001* (2013.01); *G02B 6/004* (2013.01); *G02B 6/0033* (2013.01);
(Continued)

(58) Field of Classification Search
CPC  G02B 6/0038; G02B 6/0036; G02B 6/0028; G02B 6/10; G02B 6/0016; G02B 6/0033; G02B 6/004
USPC ........ 385/146; 362/608, 609, 610, 615, 619, 362/622, 623, 624, 625; 359/464
See application file for complete search history.

(56) References Cited

U.S. PATENT DOCUMENTS 4,914,553 A     4/1990  Hamada et al.
5,528,720 A  *  6/1996  Winston ................... F21V 5/02
                                                            385/129

(Continued)

FOREIGN PATENT DOCUMENTS

CN          1910399 A      2/2007
CN        101364004 A      2/2009
(Continued)

OTHER PUBLICATIONS

International search report and written opinion of international searching authority in PCT/US2013/041192 mailed Aug. 28, 2013.
(Continued)

Primary Examiner — Audrey Y Chang
(74) Attorney, Agent, or Firm — Neil G. J. Mothew; Penny L. Lowry

(57) ABSTRACT

Disclosed is an optical valve or light valve for providing large area collimated illumination from localized light sources, and system and method thereof for 2D, 3D, and/or autostereoscopic displays. An optical valve may include a stepped structure, in which the steps include separated extraction features which may be optically hidden to light propagating in a first direction. Light propagating in a second direction may be refracted, diffracted, or reflected by the features to provide illumination beams exiting from the top surface of the optical valve. Such controlled illumination may provide for efficient, multi-user autostereoscopic displays as well as improved 2D display functionality.

14 Claims, 32 Drawing Sheets

(51) Int. Cl.
*G02B 27/22* (2006.01)
*F21V 8/00* (2006.01)
*G02B 27/00* (2006.01)
*H04N 13/04* (2006.01)

(52) U.S. Cl.
CPC ........... *G02B 6/0045* (2013.01); *G02B 6/0046* (2013.01); *G02B 6/0048* (2013.01); *G02B 6/0068* (2013.01); *G02B 6/0073* (2013.01); *G02B 27/0093* (2013.01); *G02B 27/2242* (2013.01); *H04N 13/047* (2013.01); *H04N 13/0411* (2013.01)

(56) References Cited

U.S. PATENT DOCUMENTS

| | | | |
|---|---|---|---|
| 5,727,107 A | 3/1998 | Umemoto et al. | |
| 5,959,664 A | 9/1999 | Woodgate | |
| 5,971,559 A | 10/1999 | Ishikawa et al. | |
| 6,014,164 A | 1/2000 | Woodgate et al. | |
| 6,061,489 A | 5/2000 | Ezra et al. | |
| 6,075,557 A | 6/2000 | Holliman et al. | |
| 6,108,059 A | 8/2000 | Yang | |
| 6,199,995 B1 | 3/2001 | Umemoto | |
| 6,232,592 B1* | 5/2001 | Sugiyama | G02B 6/0038 250/208.1 |
| 6,305,813 B1 | 10/2001 | Lekson et al. | |
| 6,335,999 B1* | 1/2002 | Winston et al. | 385/146 |
| 6,422,713 B1* | 7/2002 | Fohl et al. | 362/600 |
| 6,663,254 B2 | 12/2003 | Ohsumi | |
| 6,731,355 B2* | 5/2004 | Miyashita | 349/65 |
| 6,847,488 B2 | 1/2005 | Travis | |
| 6,870,671 B2 | 3/2005 | Travis | |
| 6,883,919 B2 | 4/2005 | Travis | |
| 7,052,168 B2 | 5/2006 | Epstein et al. | |
| 7,058,252 B2 | 6/2006 | Woodgate | |
| 7,073,933 B2* | 7/2006 | Gotoh et al. | 362/624 |
| 7,101,048 B2 | 9/2006 | Travis | |
| 7,215,415 B2 | 5/2007 | Maehara | |
| 7,410,286 B2 | 8/2008 | Travis | |
| 7,430,358 B2* | 9/2008 | Qi et al. | 385/146 |
| 7,518,593 B2* | 4/2009 | Daiku | G02B 6/0058 345/102 |
| 7,528,893 B2 | 5/2009 | Schultz | |
| 7,545,429 B2 | 6/2009 | Travis | |
| 7,614,777 B2* | 11/2009 | Koganezawa | G02B 6/0068 362/613 |
| 7,660,047 B1 | 2/2010 | Travis | |
| 7,750,981 B2 | 7/2010 | Shestak | |
| 7,750,982 B2 | 7/2010 | Nelson | |
| 7,944,428 B2 | 5/2011 | Travis | |
| 7,970,246 B2 | 6/2011 | Travis | |
| 7,976,208 B2 | 7/2011 | Travis | |
| 8,016,475 B2 | 9/2011 | Travis | |
| 8,216,405 B2 | 7/2012 | Emerton | |
| 8,325,295 B2 | 12/2012 | Sugita et al. | |
| 8,354,806 B2* | 1/2013 | Travis et al. | 315/362 |
| 8,477,261 B2 | 7/2013 | Travis | |
| 8,534,901 B2 | 9/2013 | Panagotacos et al. | |
| 8,714,804 B2 | 5/2014 | Kim et al. | |
| 2003/0137738 A1 | 7/2003 | Ozawa et al. | |
| 2004/0042233 A1* | 3/2004 | Suzuki et al. | 362/561 |
| 2004/0109303 A1 | 6/2004 | Olczak | |
| 2004/0170011 A1 | 9/2004 | Kim et al. | |
| 2005/0180167 A1 | 8/2005 | Hoelen et al. | |
| 2005/0190345 A1 | 9/2005 | Dubin et al. | |
| 2005/0264717 A1 | 12/2005 | Chen et al. | |
| 2005/0276071 A1 | 12/2005 | Sasagawa et al. | |
| 2006/0139447 A1 | 6/2006 | Unkirch | |
| 2006/0221642 A1 | 10/2006 | Daiku | |
| 2006/0291053 A1 | 12/2006 | Robinson et al. | |
| 2006/0291243 A1 | 12/2006 | Niioka et al. | |
| 2007/0025680 A1 | 2/2007 | Winston et al. | |
| 2007/0035964 A1* | 2/2007 | Olczak | 362/606 |
| 2007/0115551 A1 | 5/2007 | Spilman et al. | |
| 2007/0115552 A1 | 5/2007 | Robinson et al. | |
| 2007/0223252 A1 | 9/2007 | Lee et al. | |
| 2008/0084519 A1 | 4/2008 | Brigham et al. | |
| 2008/0086289 A1 | 4/2008 | Brott | |
| 2008/0225205 A1 | 9/2008 | Travis | |
| 2008/0304282 A1 | 12/2008 | Mi et al. | |
| 2008/0316768 A1 | 12/2008 | Travis | |
| 2009/0016057 A1 | 1/2009 | Rinko | |
| 2009/0140656 A1 | 6/2009 | Kohashikawa et al. | |
| 2009/0160757 A1 | 6/2009 | Robinson et al. | |
| 2009/0225380 A1 | 9/2009 | Schwerdtner et al. | |
| 2010/0053771 A1 | 3/2010 | Travis | |
| 2010/0091254 A1 | 4/2010 | Travis et al. | |
| 2010/0177387 A1 | 7/2010 | Travis | |
| 2010/0188438 A1 | 7/2010 | Kang | |
| 2010/0188602 A1 | 7/2010 | Feng | |
| 2010/0214135 A1 | 8/2010 | Bathiche | |
| 2010/0220260 A1 | 9/2010 | Sugita et al. | |
| 2010/0231498 A1 | 9/2010 | Large | |
| 2010/0277575 A1 | 11/2010 | Ismael et al. | |
| 2010/0278480 A1 | 11/2010 | Vasylyev | |
| 2010/0300608 A1 | 12/2010 | Emerton et al. | |
| 2011/0032483 A1 | 2/2011 | Hruska et al. | |
| 2011/0043142 A1 | 2/2011 | Travis et al. | |
| 2011/0044056 A1 | 2/2011 | Travis | |
| 2011/0187293 A1 | 8/2011 | Travis | |
| 2011/0188120 A1 | 8/2011 | Tabirian et al. | |
| 2011/0216266 A1 | 9/2011 | Travis | |
| 2011/0242298 A1 | 10/2011 | Bathiche | |
| 2011/0255303 A1 | 10/2011 | Nichol et al. | |
| 2011/0285927 A1 | 11/2011 | Schultz et al. | |
| 2012/0002295 A1 | 1/2012 | Dobschal et al. | |
| 2012/0127573 A1* | 5/2012 | Robinson et al. | 359/464 |
| 2012/0299913 A1* | 11/2012 | Robinson et al. | 345/419 |
| 2014/0340728 A1 | 11/2014 | Taheri | |

FOREIGN PATENT DOCUMENTS

| | | | |
|---|---|---|---|
| EP | 0939273 A | | 1/1999 |
| EP | 0860729 B1 | | 7/2006 |
| EP | 2003394 A2 | | 12/2008 |
| JP | H108211334 A | | 8/1996 |
| JP | 08254617 A | | 10/1996 |
| JP | 08340556 A | | 12/1996 |
| JP | 2002049004 A | | 2/2002 |
| JP | 2003215349 | | 7/2003 |
| JP | 2004319364 A | | 11/2004 |
| JP | 2005135844 A | | 5/2005 |
| JP | 2005183030 A | | 7/2005 |
| JP | 2006004877 A | | 1/2006 |
| JP | 2006031941 A | | 2/2006 |
| JP | 3968742 | | 8/2007 |
| JP | 2007273288 | | 10/2007 |
| JP | 2008204874 A | | 9/2008 |
| JP | 2013540083 | | 10/2013 |
| KR | 10-2003-0064258 A | | 7/2003 |
| KR | 1020110006773 A | | 1/2011 |
| KR | 1020110017918 A | | 2/2011 |
| KR | 1020110067534 A | | 6/2011 |
| KR | 1020120048301 A | | 5/2012 |
| WO | 9911074 A1 | | 3/1999 |
| WO | 2011022342 A2 | | 2/2011 |

OTHER PUBLICATIONS

International search report and written opinion of international searching authority in PCT/US2013/041619 mailed Aug. 27, 2013.
International search report and written opinion of international searching authority in PCT/US2013/041655 mailed Aug. 27, 2013.
International search report and written opinion of international searching authority in PCT/US2013/041703 mailed Aug. 27, 2013.
International search report and written opinion of international searching authority in PCT/US2013/041548 mailed Aug. 27, 2013.
International search report and written opinion of international searching authority in PCT/US2013/041683 mailed Aug. 27, 2013.
International search report and written opinion of international searching authority in PCT/US2013/041228 mailed Aug. 23, 2013.

(56) References Cited

OTHER PUBLICATIONS

International search report and written opinion of international searching authority in PCT/US2013/041235 mailed Aug. 23, 2013.
International search report and written opinion of international searching authority in PCT/US2013/041697 mailed Aug. 23, 2013.
International preliminary report on patentability in PCT/US2011/061511 dated May 21, 2013.
International search report and written opinion of international searching authority in PCT/US2012/052189 mailed Jan. 29, 2013.
International search report and written opinion of international searching authority in PCT/US2012/042279 mailed Feb. 26, 2013.
International search report and written opinion of international searching authority in PCT/US2012/037677 mailed Jun. 29, 2012.
International search report and written opinion of international searching authority in PCT/US2011/061511 mailed Jun. 29, 2012.
Kalantar et al., "Backlight unity with double surface light emission", J. Soc. Inf. Display, vol. 12, Issue 4, pp. 379-387 (2004).
Tabiryan et al., "The promise of diffractive waveplates", Optics and Photonics News, vol. 21, Issue 3, pp. 40-45, (2010).
Travis et al., "Backlight for view-sequential autostereo 3D", Microsoft E&DD Applied Sciences, (unknown date), 25 pages.
CN-201180065590.0 Office first action dated Dec. 31, 2014.
CN-201180065590.0 Office second action dated Oct. 21, 2015.
CN-201180065590.0 Office Third action dated Jun. 6, 2016.
EP-11842021.5 Office Action dated Oct. 2, 2015.
JP-2013540083 Notice of reasons for rejection of Jun. 30, 2015.
JP-2013540083 Notice of reasons for rejection with translation mailed Jun. 21, 2016.
RU-2013122560 First office action of Russian Patent Office dated Jan. 1, 2014.
RU-2013122560 Second office action of Russian Patent Office dated Apr. 10, 2015.
AU-2011329639 Office Action of Australian Patent Office dated Nov. 19, 2010.
AU-2015258258 Office Action of Australian Patent Office dated Jun. 9, 2016.
CA-2817044 first office action of Canadian Patent Office dated Jul. 14, 2016.
CA-201480023023.2 office action dated Aug. 12, 2016.
EP-11842021.5 office action dated Dec. 12, 2014.
PCT/US2013/063125 International search report and written opinion of international searching authority mailed Jan. 20, 2014.
PCT/US2013/063133 International search report and written opinion of international searching authority mailed Jan. 20, 2014.
PCT/US2013/077288 International search report and written opinion of international searching authority mailed Apr. 18, 2014.
PCT/US2014/017779 International search report and written opinion of international searching authority mailed May 28, 2014.

* cited by examiner

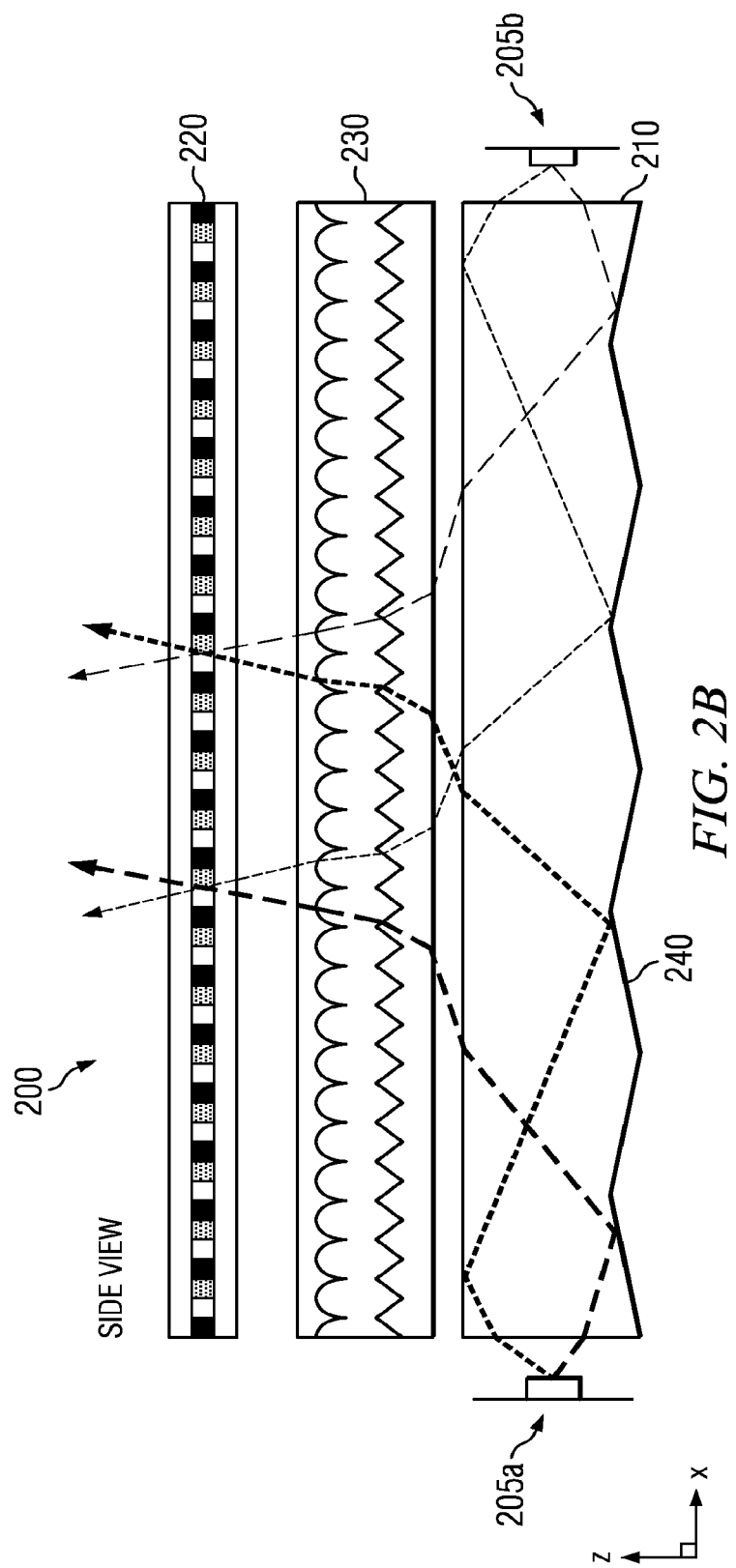

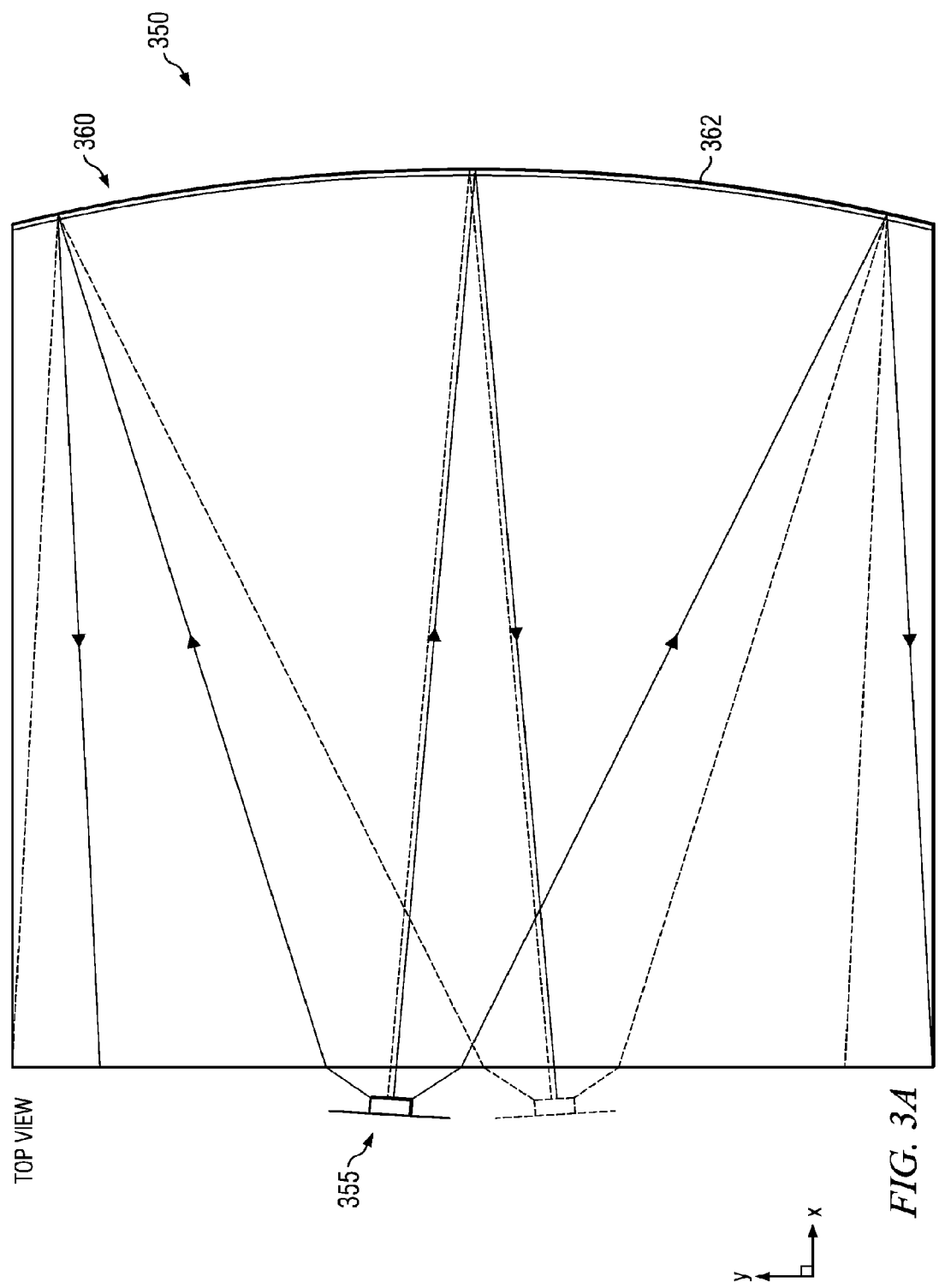

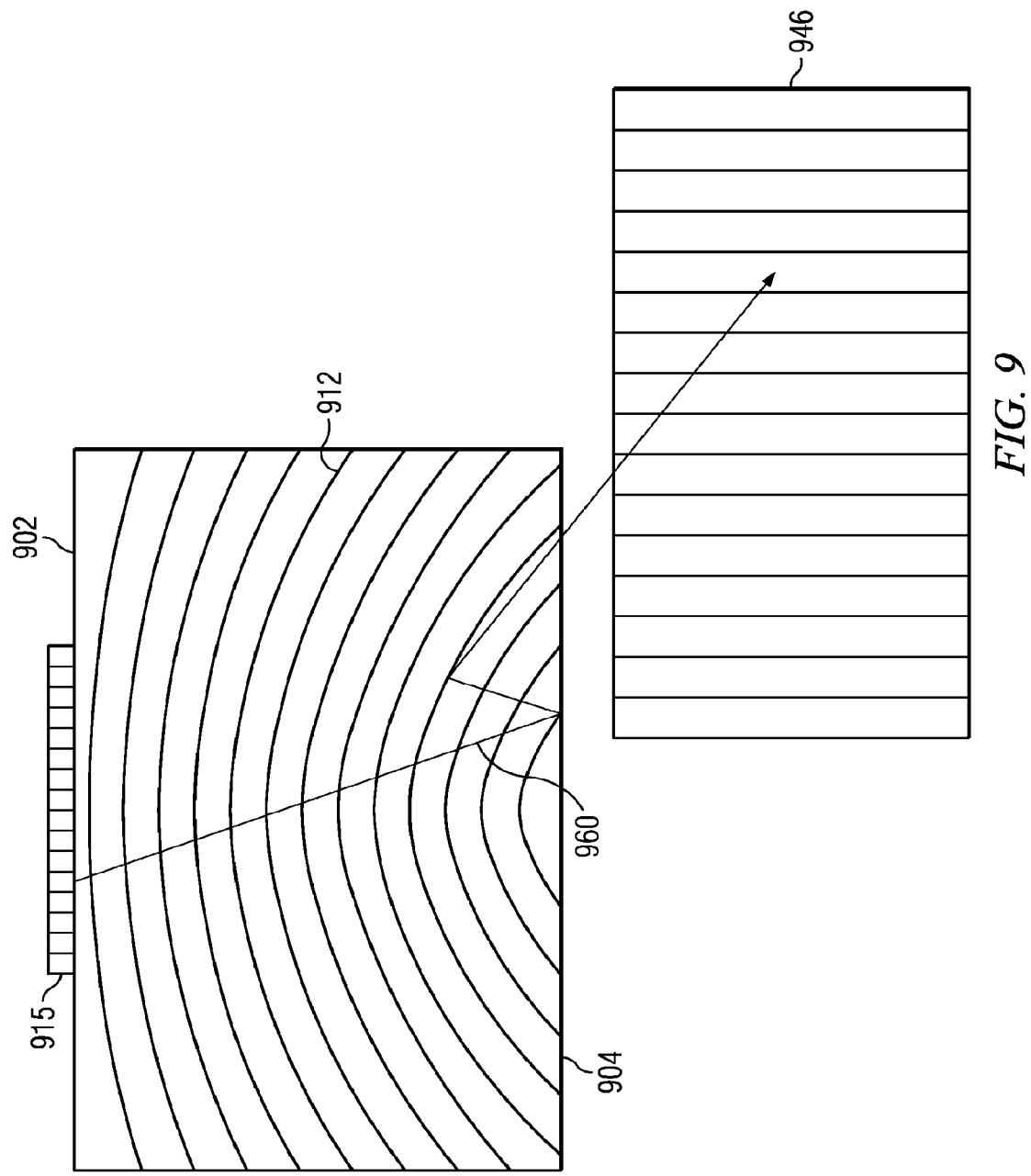

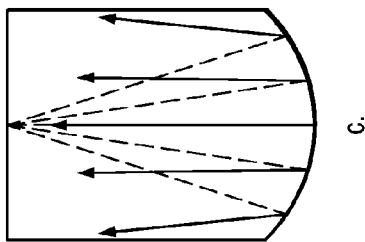
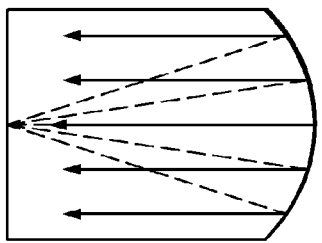
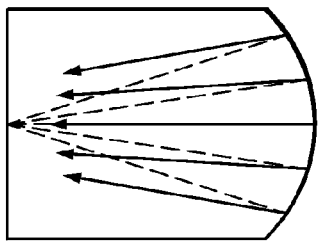
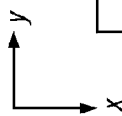
FIG. 19
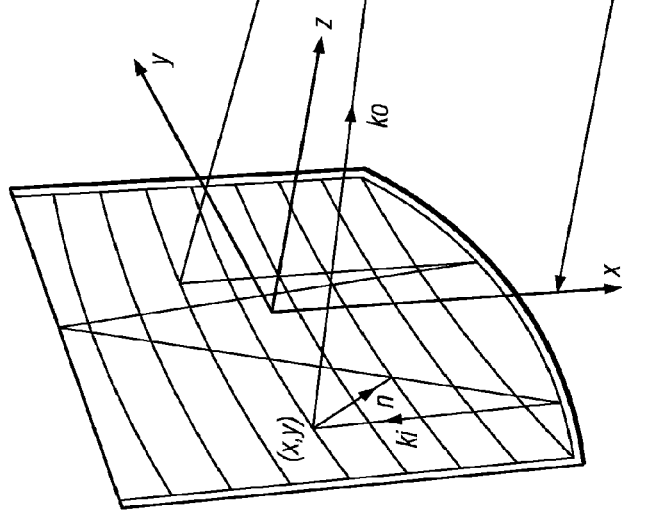
FIG. 20

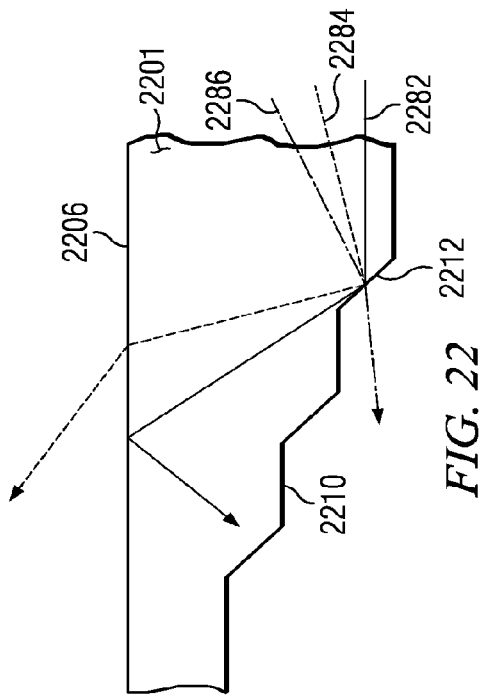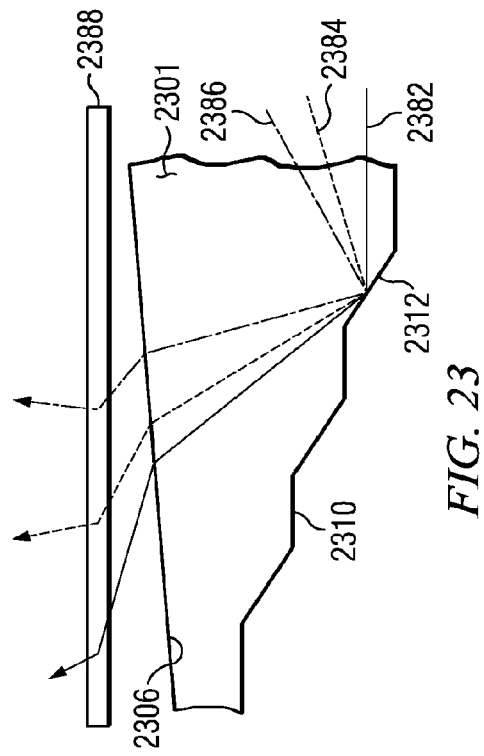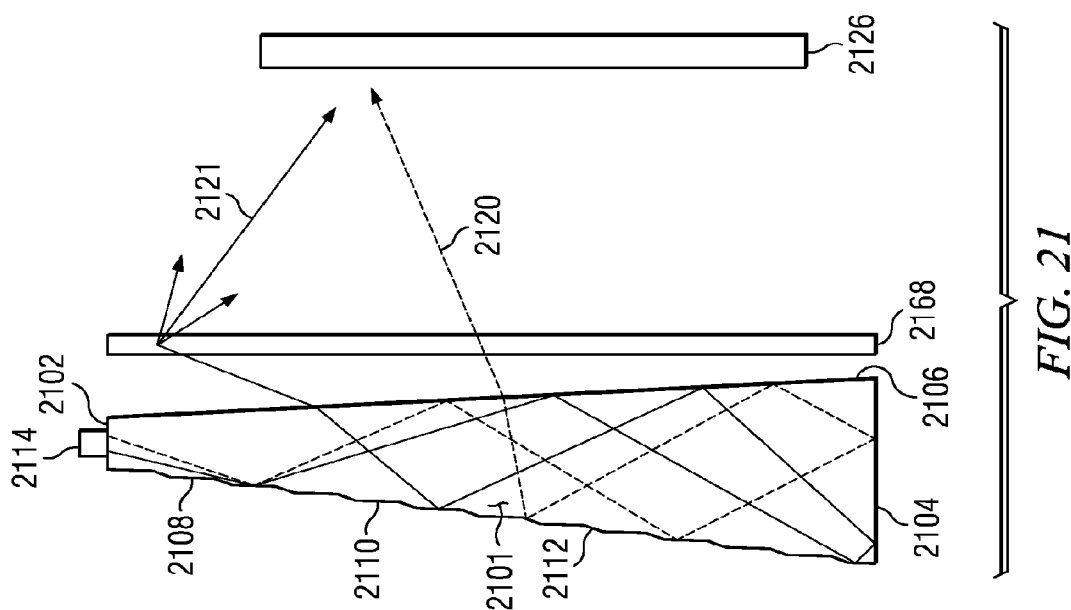

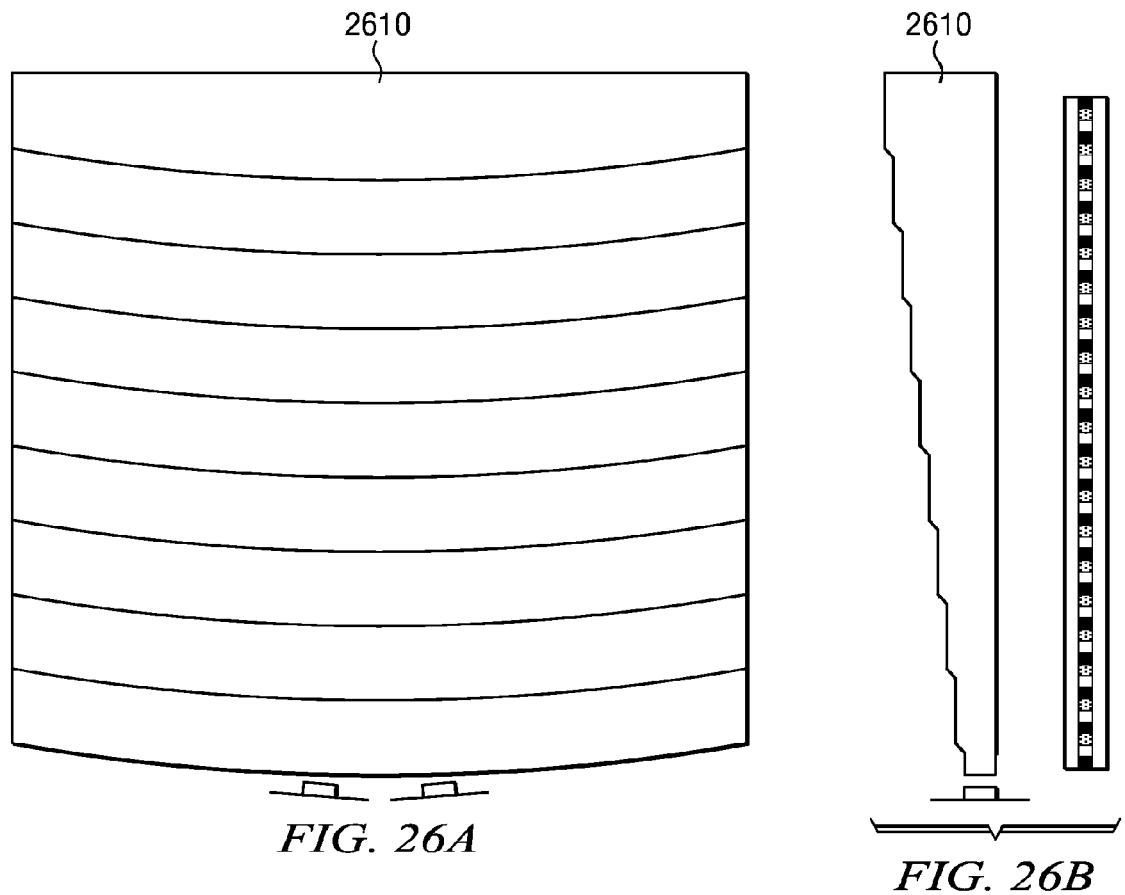
*FIG. 26A*
*FIG. 26B*
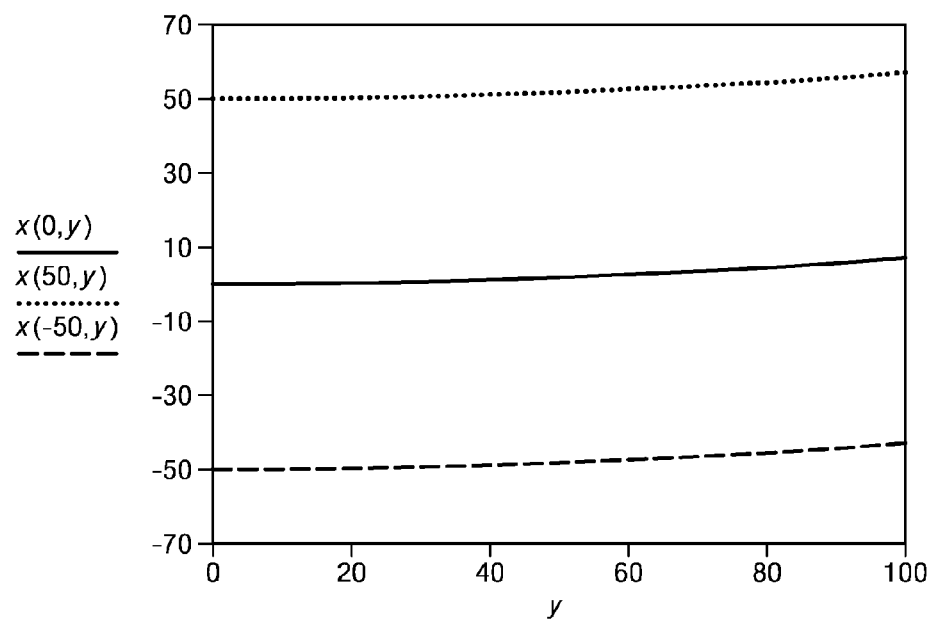
*FIG. 27*

ENERGY EFFICIENT DIRECTIONAL FLAT ILLUMINATORS

CROSS-REFERENCE TO RELATED APPLICATIONS

This application is a continuation of and claims priority to U.S. patent application Ser. No. 13/300,293, filed Nov. 18, 2011, entitled "Directional flat illuminators", which is a non-provisional application of U.S. Provisional Patent Application No. 61/415,810, filed Nov. 19, 2010, entitled "Directional flat illuminators,", both of which are commonly assigned and incorporated herein by reference for all purposes.

TECHNICAL FIELD

This disclosure generally relates to illumination of light modulation devices, and more specifically relates to light guides for providing large area directed illumination from localized light sources for use in display devices.

BACKGROUND

Spatially multiplexed autostereoscopic displays typically align a parallax component such as a lenticular screen or parallax barrier with an array of images arranged as a first and second set of pixels on a spatial light modulator. The parallax component directs light from each of the sets of pixels into different respective directions to provide first and second viewing windows in front of the display. An observer with an eye placed in the first viewing window can see a first image with light from the first set of pixels and with an eye placed in the second viewing window can see a second image, with light from the second set of pixels.

These displays have reduced spatial resolution compared to the native resolution of the spatial light modulator and further, the structure of the viewing windows is determined by the pixel aperture shape and parallax component imaging function. Gaps between the pixels, for example, for electrodes, typically produce non-uniform viewing windows. Undesirably, such displays exhibit image flicker as an observer moves laterally with respect to the display and so limit the viewing freedom of the display. Such flicker can be reduced by defocusing the optical elements; however such defocusing results in increased levels of image cross talk and increases visual strain for an observer. Such flicker can be reduced by adjusting the shape of the pixel aperture, however such changes can reduce display brightness and can include addressing electronics in the spatial light modulator.

BRIEF SUMMARY

According to the present disclosure, a method for guiding light by employing an optical valve may allow light rays to propagate in a first direction through the optical valve, and the light may propagate in the first direction with substantially low loss. Additionally, the optical valve may allow the light rays to interact with an end surface of the optical valve and also may allow the light rays to propagate in a second direction through the optical valve, and while propagating in the second direction, at least some of the light rays may encounter at least one extraction feature and may be extracted from the optical valve.

According to another aspect of the present disclosure, a light valve for guiding light, may include a first light guiding surface, wherein the first light guiding surface is substantially planar, and a second light guiding surface which may be opposite the first light guiding surface and may further include a plurality of guiding features and a plurality of extraction features. The extraction features and the guiding features may be connected to each other and alternate with one another respectively, and the plurality of extraction features may allow light to pass with substantially low loss when the light is propagating in a first direction and may allow light to reflect and exit the light valve when the light is propagating in a second direction.

According to yet another aspect of the present disclosure, an optical valve system, may include a plurality of illumination elements at least operably coupled to a first end of an optical valve, and in which the optical valve may include a first light guiding surface which may be substantially planar. The optical valve may also include a second light guiding surface, opposite the first light guiding surface, and may include a plurality of guiding features and a plurality of extraction features. The extraction features and the guiding features may be connected to each other and alternate with each other. The extraction features may allow light to pass with substantially low loss when the light is propagating in a first direction and may allow light to reflect and exit the light valve when the light is propagating in a second direction.

According to another aspect of the present disclosure, an optical valve may include an input side which may be located at a first end of an optical valve, a reflective side which may be located at a second end of the optical valve, and a first light directing side and a second light directing side which may be located between the input side and the reflective side of the optical valve. The second light directing side may include a plurality of guiding features and a plurality of extraction features. The plurality of guiding features may connect respective extraction features.

According to another aspect of the present disclosure, a directional display system may include an illuminator array that may provide light rays to an optical valve. The optical valve may include a first light guiding surface of the optical valve, and in which the first light guiding surface may be substantially planar. The optical valve may also include a second light guiding surface of the optical valve, opposite the first light guiding surface, and may include a plurality of guiding features and a plurality of extraction features. The plurality of extraction features may include a first region and a second region. The extraction features of the first and second regions may have respective orientations such that at least some of the light rays from a first illuminator may be directed to a first viewing window outside of the optical valve and at least some of the light rays from a second illuminator may be directed to a second viewing window different from the first viewing window outside of the optical valve.

According to another aspect of the present disclosure, an observer tracking autostereoscopic display, may include an optical valve, an array of illumination elements which may provide light to the optical valve and a sensor for detecting an observer in the proximity of viewing windows of the optical valve and an illuminator controller for determining a setting for the array of illumination elements, in which the setting may determine a first illumination phase for a first set of illuminator elements which may correspond to a first viewing window, and the setting may determine a second illumination phase for a second set of illuminator elements which may correspond to a second viewing window.

Generally, a light valve or optical valve may provide large area illumination from localized light sources. The terms light valve and optical valve may be used interchangeably herein. An optical valve may be a waveguide in one example, and may include a stepped structure, in which the steps may be extraction features that may be effectively, optically hidden to guided light which may be propagating in a first direction. Returning light which may be propagating in a second direction may be refracted, diffracted, and/or reflected by the extraction features to provide illumination which may exit from the top surface of the optical valve. Such controlled illumination may provide for efficient, multi-user autostereoscopic displays as well as improved 2D display functionality.

These and other advantages and features of the present disclosure will become apparent to those of ordinary skill in the art upon reading this disclosure in its entirety.

BRIEF DESCRIPTION OF THE DRAWINGS

Embodiments are illustrated by way of example in the accompanying figures, in which like reference numbers indicate similar parts, and in which:

FIG. 2B is a schematic diagram showing a side view of the autostereoscopic display of FIG. 2A;

FIG. 3A is a schematic diagram showing a top view of a known wedge waveguide structure;

FIG. 9 is a schematic diagram illustrating an optical valve including a planar reflective side, in accordance with the present disclosure;

FIG. 19 is a schematic diagram illustrating options for the reflective side, in accordance with the present disclosure;

FIG. 20 is a schematic diagram illustrating ray paths in an optical valve, in accordance with the present disclosure;

FIG. 21 is a schematic diagram illustrating an optical valve including a further tilt between the first light directing side and guiding features of the second light directing side, in accordance with the present disclosure;

FIG. 22 is a schematic diagram illustrating in cross section the light rays in a substantially parallel sided optical valve, in accordance with the present disclosure;

FIG. 23 is a schematic diagram illustrating in cross section the light rays in a tapered optical valve, in accordance with the present disclosure;

FIG. 26A is a schematic diagram showing a top view of an optical valve structure, in accordance with the present disclosure;

FIG. 26B is a schematic diagram showing a side view of the optical valve structure of FIG. 26A, in accordance with the present disclosure;

FIG. 27 is a graph illustrating extraction feature curves for different x offsets, in accordance with the present disclosure;

DETAILED DESCRIPTION

Figure 1A:
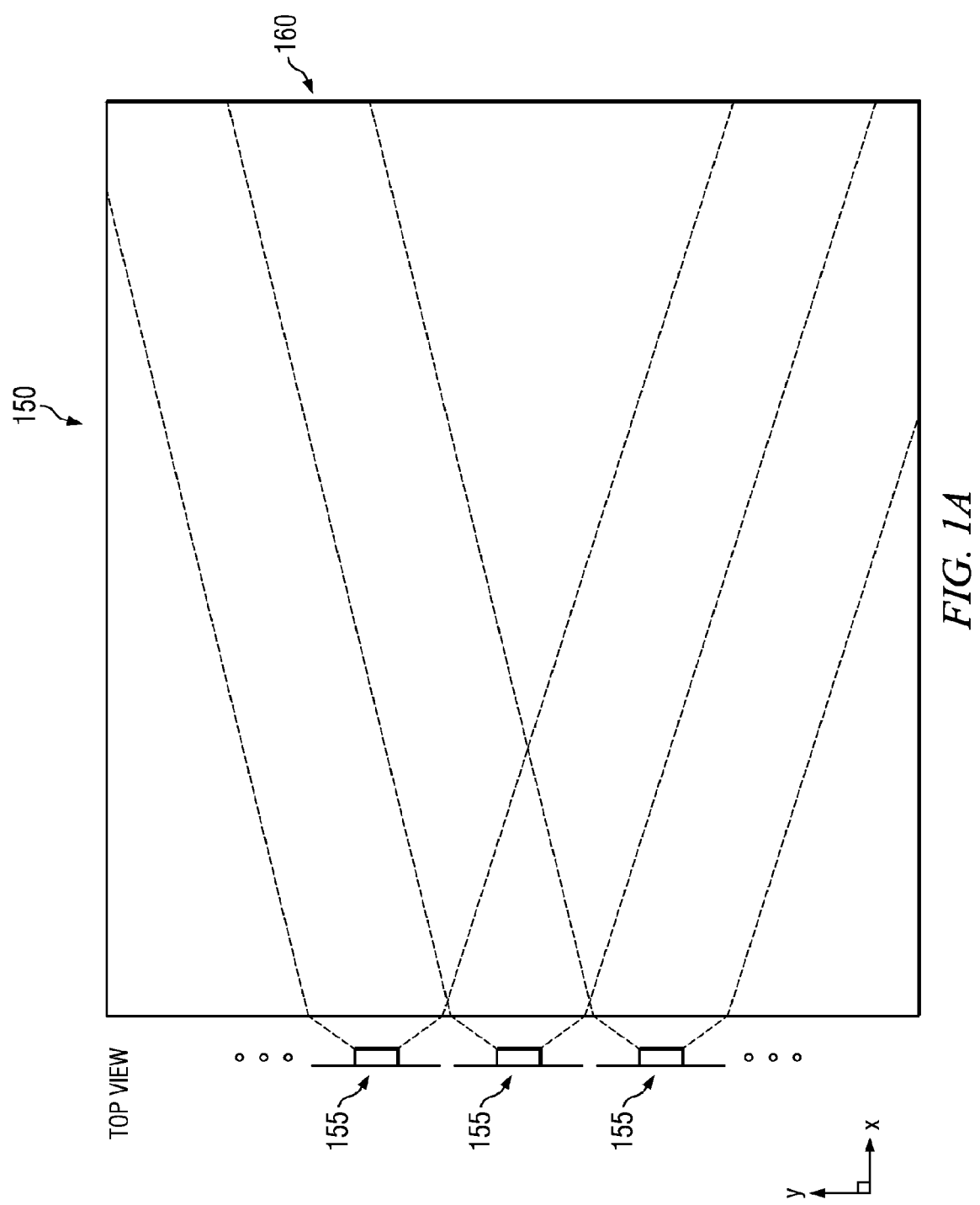
FIG. 1A is a schematic diagram showing a top view of a conventional waveguide backlight illuminator.

Generally, in the present disclosure, a method for guiding light by employing an optical valve may allow light rays to propagate in a first direction through the optical valve, and the light may propagate in the first direction with substantially low loss. Additionally, the optical valve may allow the light rays to interact with an end surface of the optical valve and also may allow the light rays to propagate in a second direction through the optical valve, and while propagating in the second direction, at least some of the light rays may encounter at least one extraction feature and may be extracted from the optical valve.

According to another aspect of the present disclosure, a light valve for guiding light, may include a first light guiding surface, wherein the first light guiding surface is substantially planar, and a second light guiding surface which may be opposite the first light guiding surface and may further include a plurality of guiding features and a plurality of extraction features. The extraction features and the guiding features may be connected to each other and alternate with one another respectively, and the plurality of extraction features may allow light to pass with substantially low loss when the light is propagating in a first direction and may allow light to reflect and exit the light valve when the light is propagating in a second direction.

According to yet another aspect of the present disclosure, an optical valve system, may include a plurality of illumination elements at least operably coupled to a first end of an optical valve, and in which the optical valve may include a first light guiding surface which may be substantially planar. The optical valve may also include a second light guiding surface, opposite the first light guiding surface, and may include a plurality of guiding features and a plurality of extraction features. The extraction features and the guiding features may be connected to each other and alternate with each other. The extraction features may allow light to pass with substantially low loss when the light is propagating in a first direction and may allow light to reflect and exit the light valve when the light is propagating in a second direction.

According to another aspect of the present disclosure, an optical valve may include an input side which may be located at a first end of an optical valve, a reflective side which may be located at a second end of the optical valve, and a first light directing side and a second light directing side which may be located between the input side and the reflective side of the optical valve. The second light directing side may include a plurality of guiding features and a plurality of extraction features. The plurality of guiding features may connect respective extraction features.

According to another aspect of the present disclosure, a directional display system may include an illuminator array that may provide light rays to an optical valve. The optical valve may include a first light guiding surface of the optical valve, and in which the first light guiding surface may be substantially planar. The optical valve may also include a second light guiding surface of the optical valve, opposite the first light guiding surface, and may include a plurality of guiding features and a plurality of extraction features. The plurality of extraction features may include a first region and a second region. The extraction features of the first and second regions may have respective orientations such that at least some of the light rays from a first illuminator may be directed to a first viewing window outside of the optical valve and at least some of the light rays from a second illuminator may be directed to a second viewing window different from the first viewing window outside of the optical valve.

According to another aspect of the present disclosure, an observer tracking autostereoscopic display, may include an optical valve, an array of illumination elements which may provide light to the optical valve and a sensor for detecting an observer in the proximity of viewing windows of the optical valve and an illuminator controller for determining a setting for the array of illumination elements, in which the setting may determine a first illumination phase for a first set of illuminator elements which may correspond to a first viewing window, and the setting may determine a second illumination phase for a second set of illuminator elements which may correspond to a second viewing window.

Generally, a light valve or optical valve may provide large area illumination from localized light sources. The terms light valve and optical valve may be used interchangeably herein. An optical valve may be a waveguide in one example, and may include a stepped structure, in which the steps may be extraction features that may be effectively, optically hidden to guided light which may be propagating in a first direction. Returning light which may be propagating in a second direction may be refracted, diffracted, and/or reflected by the extraction features to provide illumination which may exit from the top surface of the optical valve. Such controlled illumination may provide for efficient, multi-user autostereoscopic displays as well as improved 2D display functionality.

Generally, an optical valve may be an optical structure or any type of optical device that may guide and/or direct light. Light may propagate within the optical valve in a first direction from an input side to a reflective side and may be transmitted substantially without loss. Light may be reflected at the reflective side and may propagate in a second direction substantially opposite the first direction. As the light propagates in the second direction, the light may be incident on light extraction features which may extract or redirect the light outside the optical valve. Stated differently, the optical valve may allow light to propagate in the first direction and may allow light to be extracted while propagating in the second direction.

In one embodiment, the optical valve may function as an optical valve directional backlight and may achieve time sequential directional illumination of large display areas. Time multiplexed autostereoscopic displays can advantageously improve the spatial resolution of autostereoscopic display by directing light from substantially all of the pixels of a spatial light modulator to a first viewing window in a first time slot, and substantially all of the pixels to a second viewing window in a second time slot. Thus an observer with eyes arranged to receive light in first and second viewing windows may see a full resolution image across the whole of the display over multiple time slots. Time multiplexed displays can achieve directional illumination by directing an illuminator array through a substantially transparent time multiplexed spatial light modulator using directional optical elements, in which the directional optics substantially form an image of the illuminator array in the window plane. Furthermore, the uniformity of the viewing windows may be advantageously independent of the arrangement of pixels in the spatial light modulator. Advantageously such displays can provide observer tracking displays which have low flicker, with low levels of cross talk for a moving observer.

To achieve high uniformity in the window plane it may be desirable to provide an array of illumination elements that have a high spatial uniformity. The illuminator elements of the time sequential illumination system may be provided for examples by pixels of a spatial light modulator with size approximately 100 micrometers in combination with a lens array. However, such pixels may suffer from the same difficulties as for spatially multiplexed displays. Further such devices may have low efficiency and higher cost, requiring additional display components.

High window plane uniformity can be conveniently achieved with macroscopic illuminators, for example, optical elements that may be approximately 1 mm or greater. However, the increased size of the illuminator elements may mean that the size of the directional optical elements may increase proportionately. For example, an approximately 16 mm wide illuminator imaged to an approximately 65 mm wide viewing window may result in an approximately 200 mm back working distance. Thus, the increased thickness of the optical elements can prevent useful application, for example to mobile displays, or large area displays.

Additionally, optical elements may be employed that are thinner than the back working distance of the optical elements to direct light from macroscopic illuminators to a window plane. Thin may be discussed with respect to an optical valve illuminator which may relate to the thickness of the optical valve in the z direction and which may be in the approximate range of 0.1 mm to 25 mm. Such displays may use an array of facets configured to extract light propagating in a second direction in a substantially parallel optical valve.

Embodiments herein may provide an autostereoscopic display with large area and thin structure. Further, as will be described, the optical valves of the present disclosure may achieve thin optical components with large back working distances. Such components can be used in directional backlights, to provide directional displays including autostereoscopic displays. Further, one embodiment may provide a controlled illuminator for the purposes of an efficient autostereoscopic display. Additionally, one embodiment may relate to a directional backlight apparatus and a directional display which may incorporate the directional backlight apparatus. Such an apparatus may be used for autostereoscopic displays, privacy displays and other directional display applications In one embodiment, the optical function of the directional backlight can be provided by non-linear light extraction features that may be integrated into the optical valve structure, reducing cost and complexity. A combination of optical functions can advantageously be provided in the extraction features to reduce the number of additional optical films that may be employed to provide viewing windows from the illumination structure. The uniformity of illumination of the display can be increased compared to linear extraction features. Further the sag of edge reflectors can be reduced so that the size of the bezel of the directional backlight may be reduced, improving the visual appearance of the bezel. Advantageously Moiré between the directional backlight and the panel can be reduced. Additionally, the aberrations of the display can be optimized for a range of viewing positions, to increase viewing freedom.

It should be noted that embodiments of the present disclosure may be used in a variety of optical systems, display systems, and projection systems. The embodiment may include or work with a variety of projectors, projection systems, optical components, displays, microdisplays, computer systems, processors, self-contained projector systems, visual and/or audiovisual systems and electrical and/or optical devices. Aspects of the present disclosure may be used with practically any apparatus related to optical and electrical devices, optical systems, display systems, entertainment systems, presentation systems or any apparatus that may contain any type of optical system. Accordingly, embodiments of the present disclosure may be employed in optical systems, devices used in visual and/or optical presentations, visual peripherals and so on and in a number of computing environments.

Before proceeding to the disclosed embodiments in detail, it should be understood that the disclosure is not limited in its application or creation to the details of the particular arrangements shown, because the disclosure is capable of other embodiments. Moreover, aspects of the disclosure may be set forth in different combinations and arrangements to define embodiments unique in their own right. Also, the terminology used herein is for the purpose of description and not of limitation.

Figure 1B:
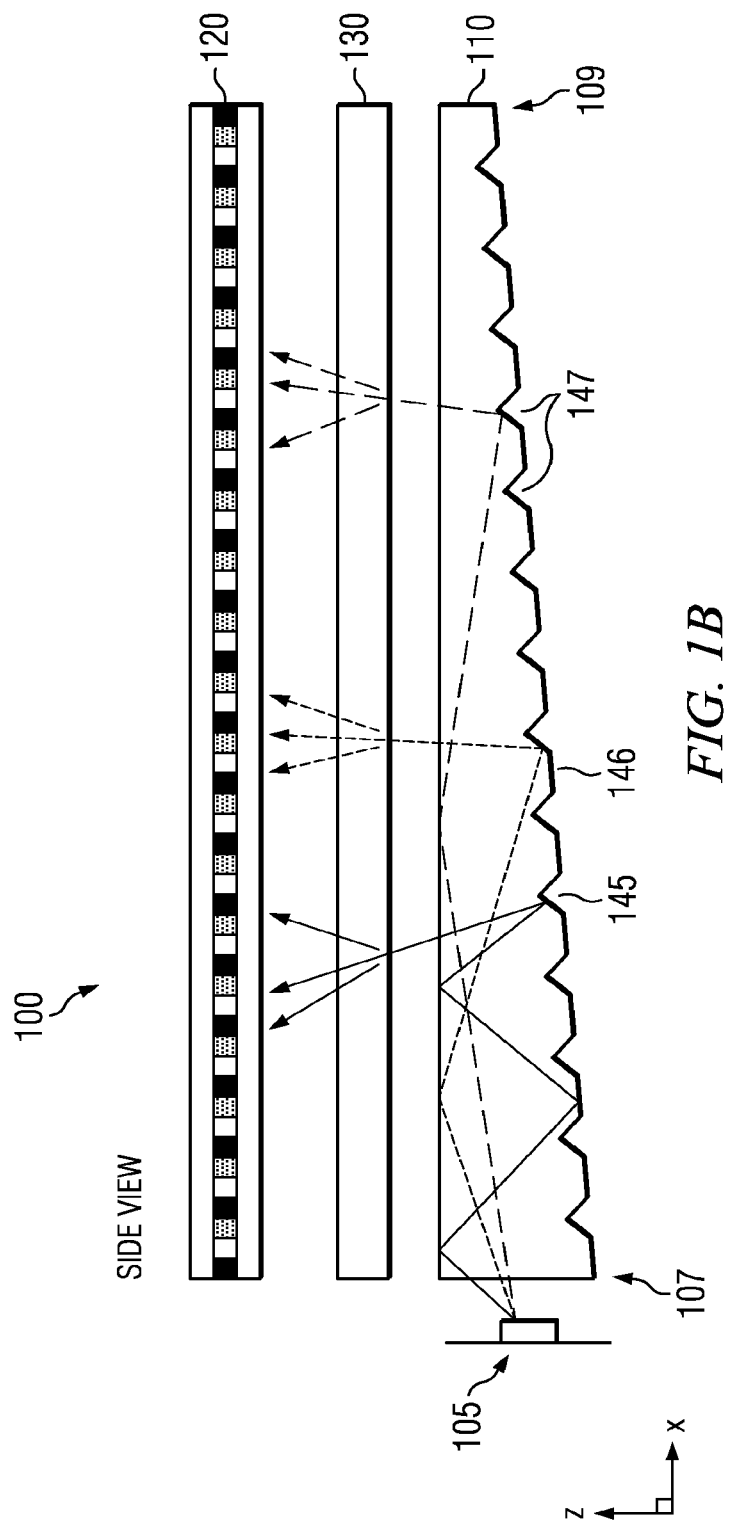
FIG. 1B is a schematic diagram showing a side view of the conventional waveguide backlight illuminator of FIG. 1A.

FIGS. 1A and 1B are schematic diagrams showing top and side views, respectively, of a conventional waveguide backlight illuminator. The top view 150 of FIG. 1A includes LEDs 155 which may be used to illuminate a wedged waveguide 160. Wedged waveguides with scattering features are routinely used for LCD illumination. The top view 150 is illustrated in the xy plane.

The side view 100 of FIG. 1B is illustrated in the xz plane and includes LED 105, waveguide 110, LCD 120, diffuser 130 and reflecting elements 140. The side view 100 of FIG. 1B, is an alternative view of top view 150 of FIG. 1A. Accordingly, LED 105 of FIG. 1B may correspond to LEDs 155 and the waveguide 110 of FIG. 1B may correspond to the waveguide 160 of FIG. 1A.

As shown in FIG. 1B, LED 105 may illuminate a thicker edge 107 of the waveguide 110, and light may propagate within the waveguide 110. A proportion of the propagating light periodically encounters a reflecting element 140 such as at point 145, which may scatter the light rays. The scattered rays of light that have propagation angles that exceed the critical angle of the waveguide 110, exit to pass through the diffuser 130 and then illuminate the LCD 120. The remaining scattered rays of light get compressed steadily by the wedge profile as the light rays travel toward the thin end 109 of the waveguide 110. The light rays encounter more and more scattering features, illustrated at points 146 and 147 in the waveguide 110, until the majority of the illuminating light leaves the waveguide 110. In this manner, the gradual light leakage spreads the light from a localized source along the waveguide 110 x-axis, to illuminate the LCD 120. LEDs 155 may be positioned adjacent to one another, as shown in FIG. 1A, so that light may propagate in the direction of the waveguide orthogonal to its wedge profile, along the y-axis. The diffuser 130 may also be used to diffuse illumination, as illustrated in FIG. 1B.

While this conventional approach provides illumination, the exit ray angles of the light are not controlled and are not directed. Without control of the illumination, no opportunity for efficiency, privacy and autostereoscopic applications is possible.

Figure 2A:
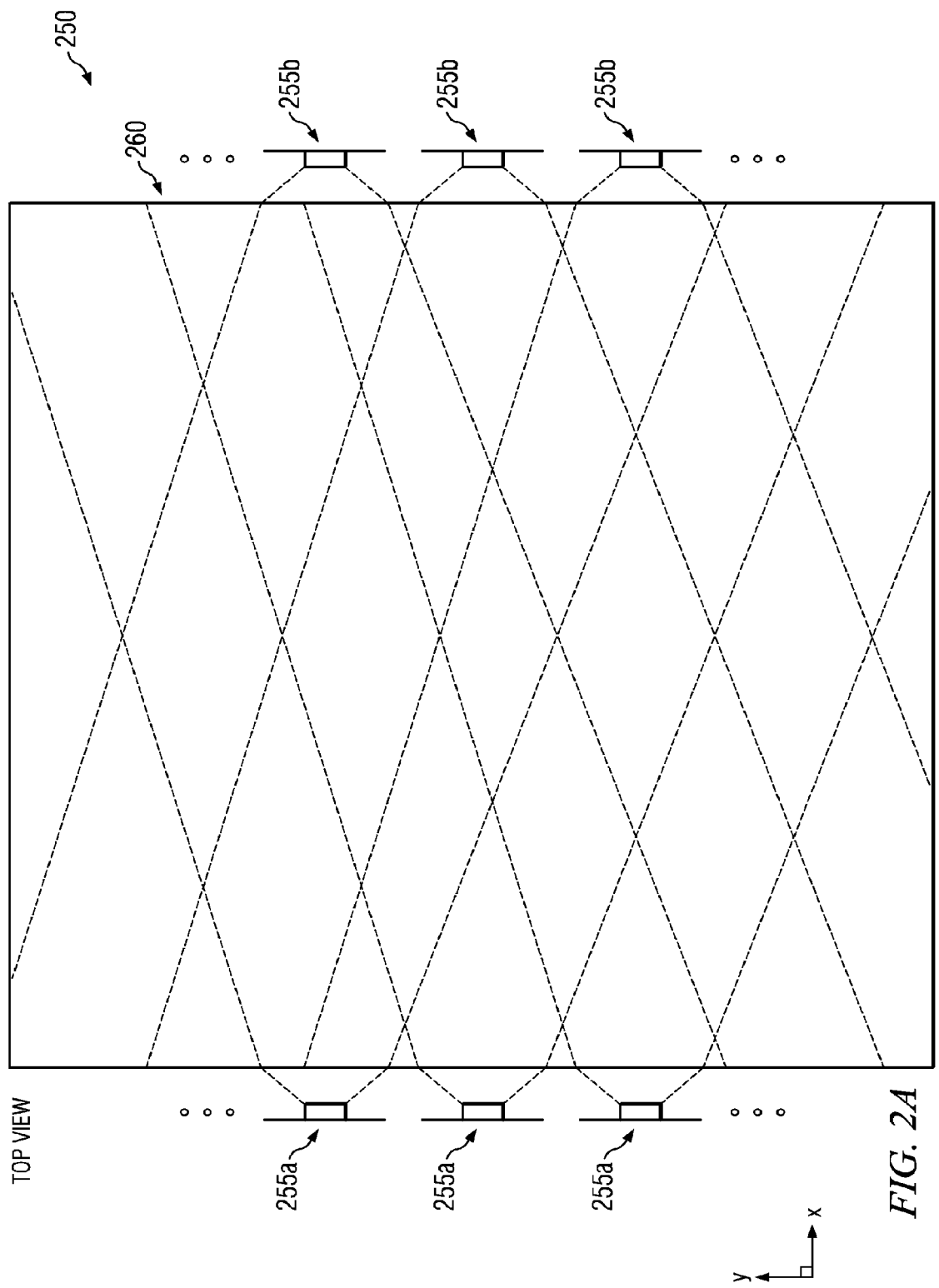
FIG. 2A is a schematic diagram showing a top view of a known autostereoscopic display.

FIGS. 2A and 2B are schematic diagrams showing a top view and a side view of a known autostereoscopic display. The top view 250 of FIG. 2A is illustrated in the xy plane and includes LEDs 255a and 255b which may be used to illuminate a waveguide 210. Additionally, the side view 200 of FIG. 2B is illustrated in the xz plane and includes LEDs 205a and 205b, LCD 220, 3M film 230, waveguide 210 and reflecting elements 240. The side view 200 of FIG. 2B is an alternative view of top view 250 of FIG. 2A. Accordingly, LEDs 205a and b of FIG. 2B may correspond to LEDs 255a and 255b of FIG. 2A and the waveguide 110 of FIG. 1B may correspond to the waveguide 260 of FIG. 2A.

More recently, output illumination with angular control has been developed as discussed in U.S. Pat. No. 7,750,982 to Nelson et al., which is herein incorporated by reference. In this known example, as illustrated in FIGS. 2A and 2B, LEDs 255a and 255b, and 205a and b, respectively, are located to the left and right of a waveguide and can be modulated independently. As shown in FIG. 2B, light emitted from a right hand side LED 205b, propagates down a double wedged waveguide 210, gradually increasing its ray angles until some exceed the critical angle when total internal reflection (TIR) fails. These rays then exit the guide and propagate outside toward a display at a narrow range of angles close to 90° to the guide normal or z-axis. A microprism film, illustrated as 3M film 230 in FIG. 2B, with integral lenses located between the waveguide 210 and the LCD 220 directs this light toward along the z-axis with a spread of angles up to, but not exceeding normal propagation.

Continuing the discussion of FIG. 2B, by positioning the LCD 220 directly on top of the 3M film 230, a fully illuminated LCD would be seen only in the left eye when viewing the display normally. This image persists in the left eye only, as the display is rotated clockwise about the vertical until it starts to appear in the right eye. At this point, the display appears as a conventional 2D display. A symmetric situation is obtained in the right eye for light emitted from left hand side LED 205a of FIG. 2B. Modulating left and right eye LEDs 205a and 205b in synchronization with alternating left and right eye images supplied to the display then allows the viewer to see high resolution stereo when viewed normally. Rotating the display away from the normal provides a 2D image, avoiding the unpleasant pseudoscopic sensation, such as when a left eye stereoscopic image is seen in the right eye and vice versa, created by more conventional lenticular screen or parallax barrier approaches. Furthermore, the 3D images are full resolution unlike the conventional approaches and it can default to a conventional 2D display when all LEDs are turned on. This known stereoscopic display solution is limited in that only two beams are controlled independently, thus preventing privacy efficient illumination modes and freedom of head movement in an autostereoscopic system that multiple independently modulated beams may allow.

Figure 3B:
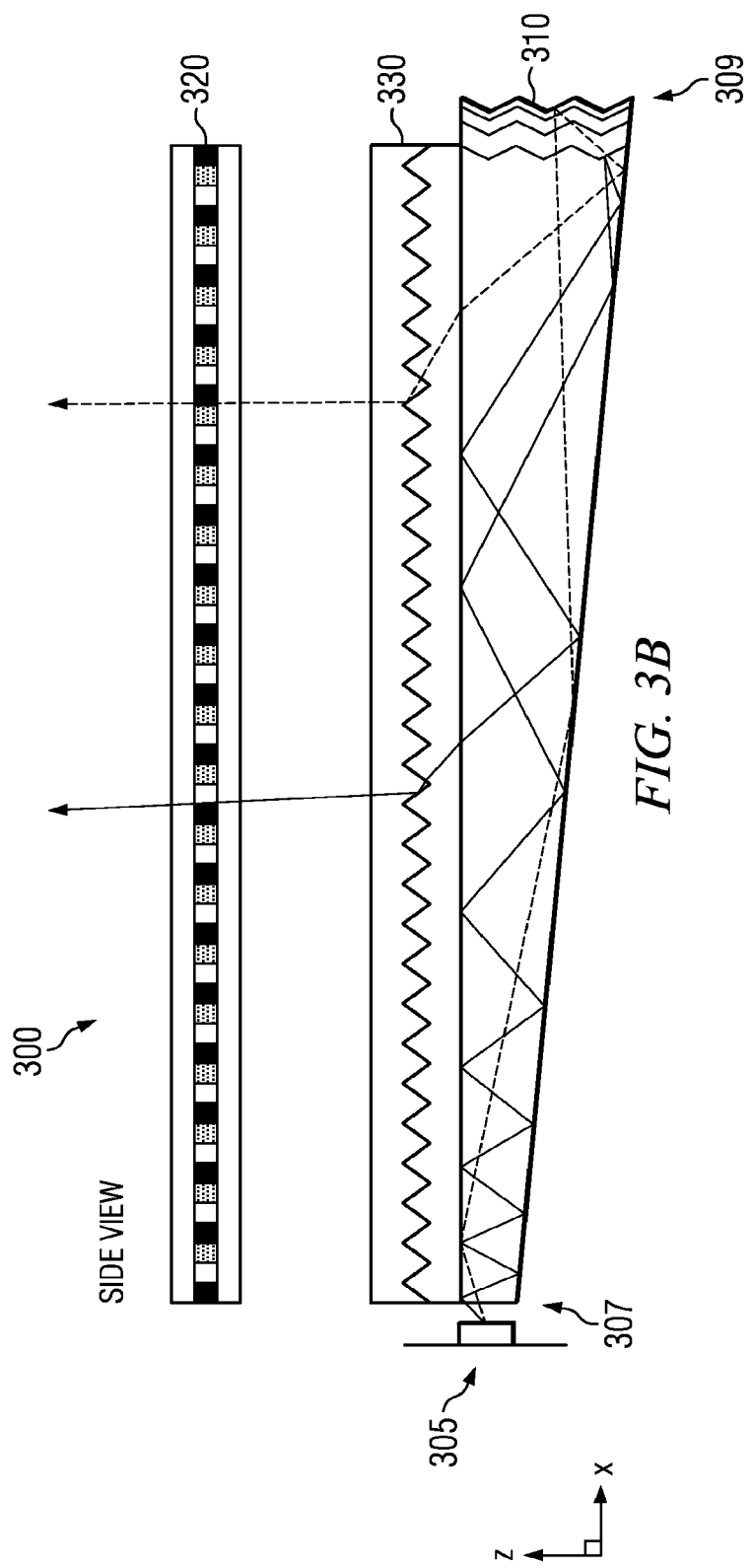
FIG. 3B is a schematic diagram showing a side view of the wedge waveguide structure of FIG. 3A.

FIGS. 3A and 3B are schematic diagrams showing a top view and a side view of another known autostereoscopic display. The top view 350 of FIG. 3A is illustrated in the xy plane and includes LED 355 which may be used to illuminate a wedge waveguide 360. As shown in FIG. 3A, the wedge waveguide 360 may have a reflecting corrugated surface 362. Additionally, the side view 300 of FIG. 3B is illustrated in the xz plane and includes LED 305, LCD 320, redirection film 330, and waveguide 310. The side view 300 of FIG. 3B is an alternative view of top view 350 of FIG. 3A. Accordingly, LED 305 of FIG. 3B may correspond to the LED 355 of FIG. 3A and the wedge waveguide 310 of FIG. 3B may correspond to the wedge waveguide 360 of FIG. 3A. Similar to the waveguides of FIGS. 1A, 1B, 2A, and 2B, the wedge waveguide 310 of FIG. 3B also has a thin end 307 and a thick end 309.

As shown in FIGS. 3A and 3B, a wedge waveguide may be employed as taught in U.S. Pat. No. 7,660,047, to Travis, which is herein incorporated by reference in its entirety. The approach of FIGS. 3A and 3B employs a single LED emitter which may exhibit a small optical extent or etendue.

The wedge waveguide may provide conventional collimation in the xy plane of the waveguide and utilize the xz collimation provided by the gradual leaking of wedge waveguide through TIR failure. Furthermore, the xy collimation can be carried out in reflection, utilizing forward propagation for beam expansion and a backward collimated propagating beam for leaking light down the same waveguide. A tilted, curved reflecting edge surface provides the necessary collimation and angular bias on reflection, as shown in FIGS. 3A and 3B.

One problem with the wedge waveguide of FIGS. 3A and 3B is the requirement of deflecting the exited illumination beam away from the waveguide surface. This must be done efficiently and uniformly using a complex film. Furthermore, the symmetrical nature of a free standing wedge means leaking may be likely to occur at both top and bottom surfaces. Additionally, the spread of internal propagation ray angles are reduced, ultimately increasing wedge thickness for any given LED source. One further issue concerns the reflecting edge that has to be corrugated to avoid non-uniform illumination close to this edge. Such corrugation is costly as it has to cater for tight design tolerances.

Generally, the wedge waveguide may not function as a valve. Light that may propagate from a thin end to a thick end of the wedge waveguide may return without extraction if reflected directly from the thick end. Primarily through angular adjustment by reflection off a slanted or corrugated end mirror may light back propagate with high enough angles to be extracted.

Generally, for both optical valve and wedge waveguide illuminated displays, efficiency can be improved for example, by providing local controlled colored illumination to pixels, avoiding the need for a color filter array ("CFA"), as taught in commonly-owned United States Publication No. 2009/0160757 entitled "Intra-pixel illumination system," which is herein incorporated by reference in its entirety, or through concentrating the illumination solely into regions where viewers' eyes reside. Privacy applications may also be provided by concentrating the illumination solely into regions where viewers' eyes reside, since no illuminating light reaches the eyes of potential eavesdroppers. By modulating those illuminating beams that reach left and right eyes separately in synchronization with left and right eye image presentation, it is also possible to deliver stereoscopic information without the requirement of eyewear. This latter autostereoscopic approach may be used for handheld 3D devices.

Figure 4A:
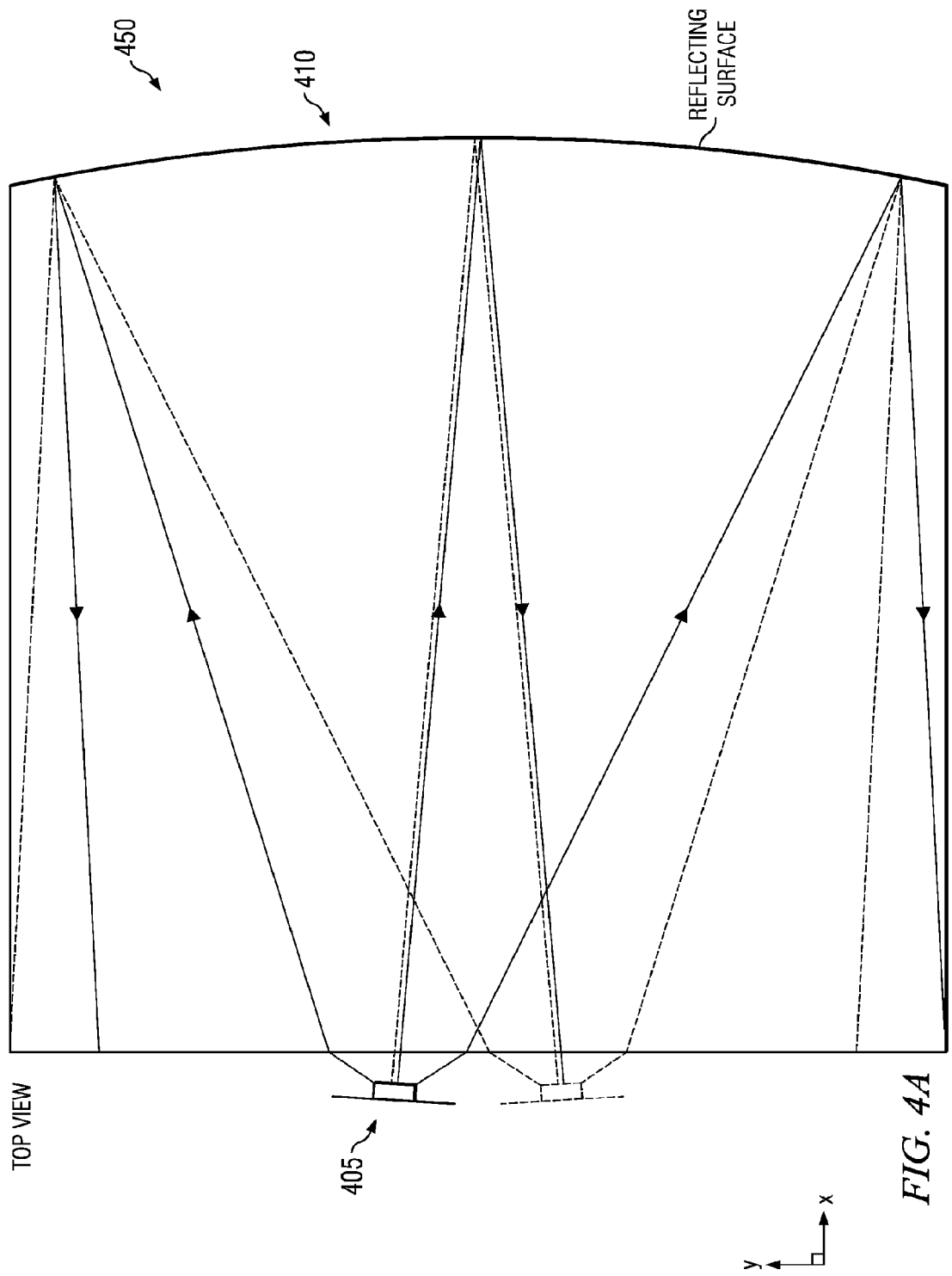
FIG. 4A is a schematic diagram showing a top view of an optical valve, in accordance with the present disclosure.
Figure 4B:
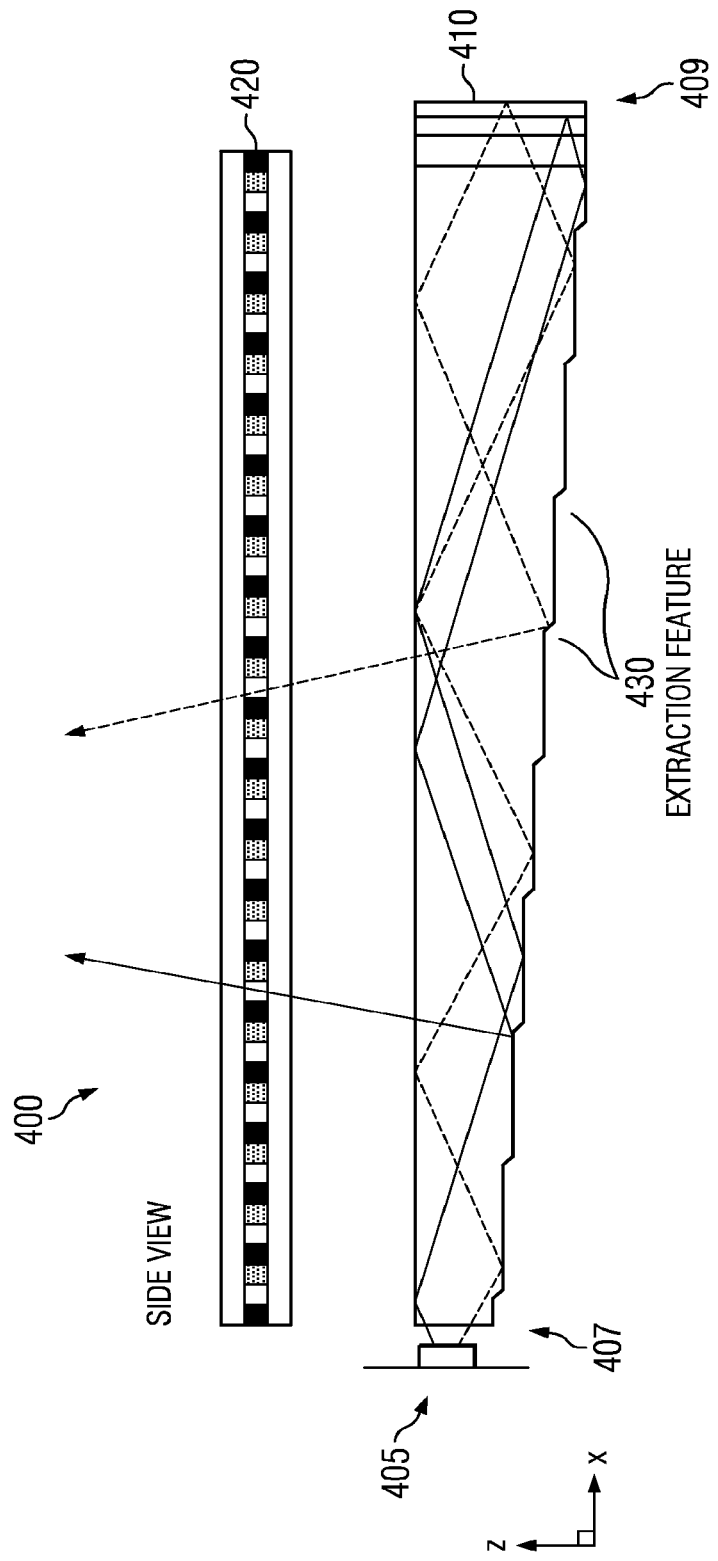
FIG. 4B is a schematic diagram showing a side view of the optical valve structure of FIG. 5A, in accordance with the present disclosure.

FIGS. 4A and 4B are schematic diagrams illustrating respective top and side views of one embodiment of an optical valve. Generally, the embodiment of FIGS. 4A and 4B may operate as an optical valve. The optical valve 410 of FIGS. 4A and 4B may be referred to as such for discussion purposes only and not of limitation.

FIGS. 4A and 4B are schematic diagrams illustrating a respective top view and a side view of one embodiment of an optical valve. The top view 450 of FIG. 4A is illustrated in the xy plane and includes LED 405 which may be used to illuminate the optical valve 410. Although an LED is discussed as the light source with respect to the embodiments discussed herein, any light source may be used such as, but not limited to, laser sources, local field emission sources, organic emitter arrays, and so forth. Additionally, the side view 400 of FIG. 4B is illustrated in the xz plane and includes LED 405, LCD 420, extraction features 430 and optical valve 410. The side view 400 of FIG. 4B is an alternative view of top view 450 of FIG. 4A. Accordingly, the LED 405 of FIGS. 4A and 4B may correspond to one another and the optical valve 410 of FIGS. 4A and 4B may correspond to one another. Further, in FIG. 4B, the optical valve 410 may have a thin end 407 and a thick end 409. Although the LCD 420 may be referred to herein for discussion purposes, other displays may be used including, but not limited to, LCOS, DLP devices as this illuminator may work in reflection, and so forth.

In the embodiment of FIGS. 4A and 4B, light propagating in a first direction may be guided through the optical valve 410 without substantial loss and light propagating in a second direction may be extracted from the optical valve 410 by employing extraction features 430. The extraction features 430 will be discussed in further detail herein. As shown in FIG. 4B, the light may propagate in a first direction which may be from the thin end 407 to the thick end 409 of the optical valve 410. Additionally, after reflecting off the end of the optical valve 410, the light may propagate in a second direction in which the second direction may be from the thick end 409 towards the thin end 407. As the light travels in the second direction, the light may encounter the extraction features 430 and be extracted from the optical valve 410, towards the LCD 420. Additionally, the extraction features may be effectively, optically hidden in the risers of the optical valve to the light propagating in the first direction.

Furthering the discussion of the optical valve 410 of FIG. 4B, light may enter a first end, for example the thin end 407 of FIG. 4B, propagate along the length of the optical valve, reflect off a second end, for example the thick end 409 of FIG. 4B, and propagate along the length of the optical valve toward the first end, and at some point along the length of the optical valve, the light may be extracted from the optical valve through interaction with an extraction feature 430.

Continuing the discussion of this embodiment, the light may homogenize and expand upon propagating in a first direction before being reflected off a non-planar surface and being extracted while propagating in a second direction. The non-planar surface may perform like a cylindrical lens allowing the light to form an image of a source in a window plane. In one example, the source imaging may be achieved by employing a similar cylindrical reflecting end surface to the wedge waveguide without the need to employ costly corrugation. By way of comparison, the reflecting end of the wedge waveguide in U.S. Pat. No. 7,660,047, to Travis has to be corrugated.

The optical valve may be a freestanding, single molded unit with a thickness that may be adjusted appropriately for different display platforms. Further, the trade off may be a loss of optical efficiency with decreasing thickness. Additionally, a relatively low thickness and low cost autostereoscopic display may be achieved and may reduce the number of optical components employed in autostereoscopic displays while improving the optical quality. Further, in one embodiment, the size of the edge bezel regions or the appropriate width oversize of the optical valve may be reduced to reduce bulk. The extraction features have substantially no light directing function for light passing through the optical valve from the first input side to the second reflective side, thus a long back working distance of the light reflecting side may be achieved and also a small thickness of the optical valve. Additionally, introducing curved surfaces to the extraction features, may functionally replace the curved end surface, making the final external dimensions of the optical valve structure more compatible with small handheld devices. Extraction features with curved surfaces will be discussed in further detail herein.

As previously discussed, the structure of one embodiment is shown in FIGS. 4A and 4B and includes an optical valve with two or more LED emitters at a thin end 407 and a reflecting curved surface at the other thick end 409 or reflecting end. Light entering the optical valve structure may propagate along the x-direction and may expand in the y-direction as shown in FIGS. 4A and 4B. The extraction features 430 may not affect the light and may not affect how the light may be guided since the extraction features 430 may be optically hidden from the light rays that cannot exceed the critical angle, $\theta c$, in which:

$$\theta c = \sin^{-1}(1/n))$$

relative to the z-axis, and in which n is the refractive index of the optical valve material. The xz angular profile of the light may remain substantially unchanged in contrast to the wedge waveguide structure described with respect to FIGS. 3A and 3B. At the far end away from the light source or the thick end 409 of the optical valve 410, the light may be incident on an end surface that may be substantially parallel to the z-axis, but curved in the xy plane. The curve may act to image the light along the angles in the same xy plane while substantially retaining the orthogonal xz angular profile. The light may form a diverging beam and may lose light or form a converging beam and fail to illuminate the edges, thus making a big bezel or width oversize appropriate.

Offset along the y-axis of the original light source input from the symmetry axis of the structure may cause the approximately collimated return light rays in the second direction to propagate at an angle $\sim\psi$ relative to the -x axis. The returning light rays may reflect off of the surfaces of the extraction features which may cause deflection toward the z-axis and extraction from the guide. Reflection from an approximately 45° oriented surface of the extraction feature may substantially preserve the xz angular spread $\theta/n$ ($\approx\theta$ in air) and the offset angle $\psi$ of the guided light, albeit the offset angle $\psi$ of the guided light may cause the light to propagate close to the z-axis and not the -x axis. The approximately 45° reflection may also approximately center the light about the normal of the exiting face in the xz plane, which may be approximately $\phi=0°$. The xz angular profile can be slightly modified since high angle rays incident on the extraction feature surface can be attenuated due to TIR failure. In one example, rays that may be between approximately negative 50 degrees and approximately five degrees from the x-axis may reflect with good efficiency, and the rays that may be approximately above five degrees may break through the extraction surface and may be optically lost. The optically lost rays may be the high angle rays. Silvering the bottom, may improve extraction efficiency of high angle rays, which may be at the expense of propagation loss while guiding the light. The offset angle $\psi$ of the guided light will be discussed in further detail at least with respect to FIGS. 5A, 5B, and 5C.

Figure 5A:
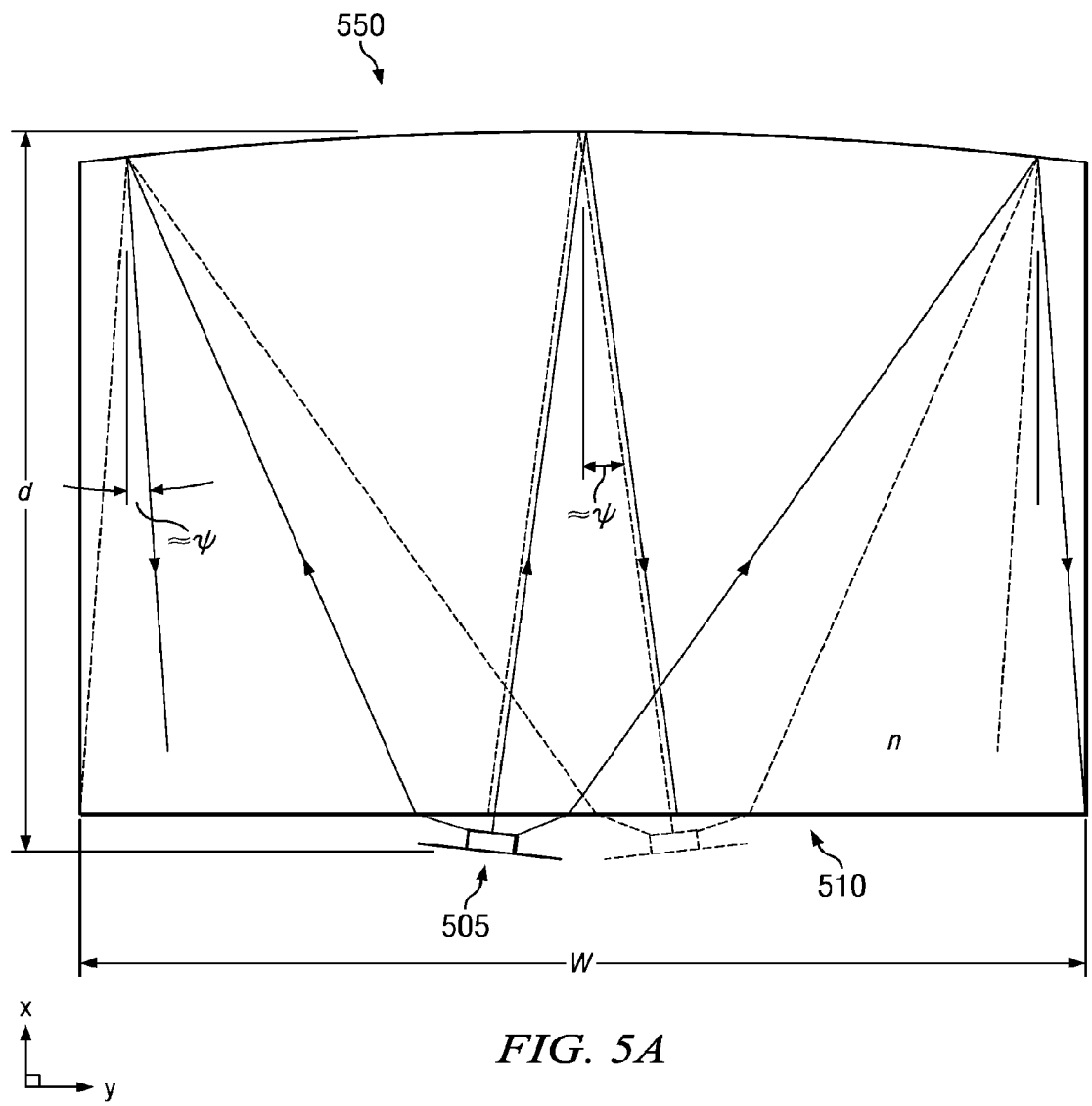
FIG. 5A is a schematic diagram showing a top view of an optical valve structure illustrating a directed output in the yz plane, in accordance with the present disclosure.
Figure 5B:
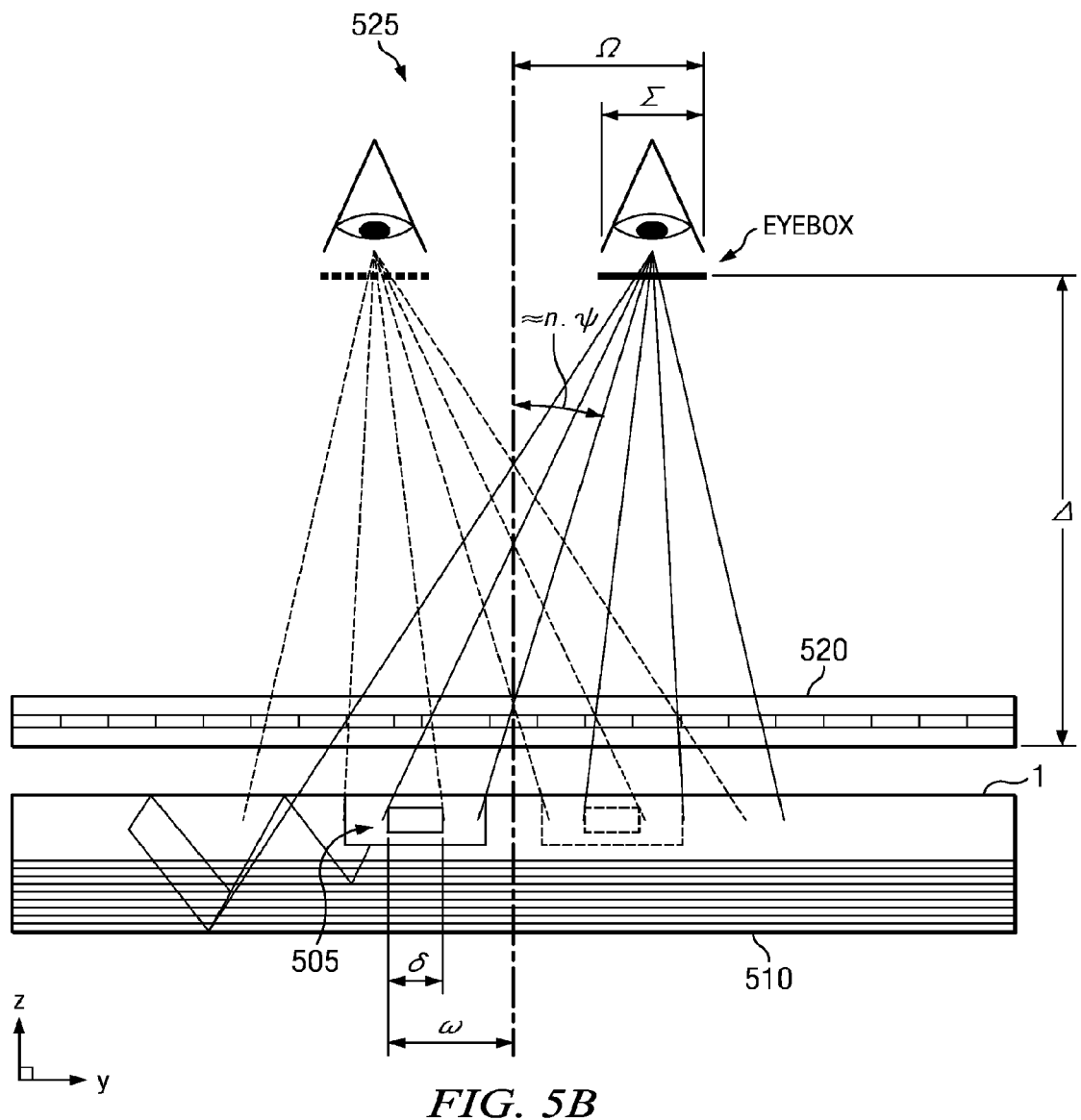
FIG. 5B is a schematic diagram showing a first side view of the optical valve structure of FIG. 5A, in accordance with the present disclosure.
Figure 5C:
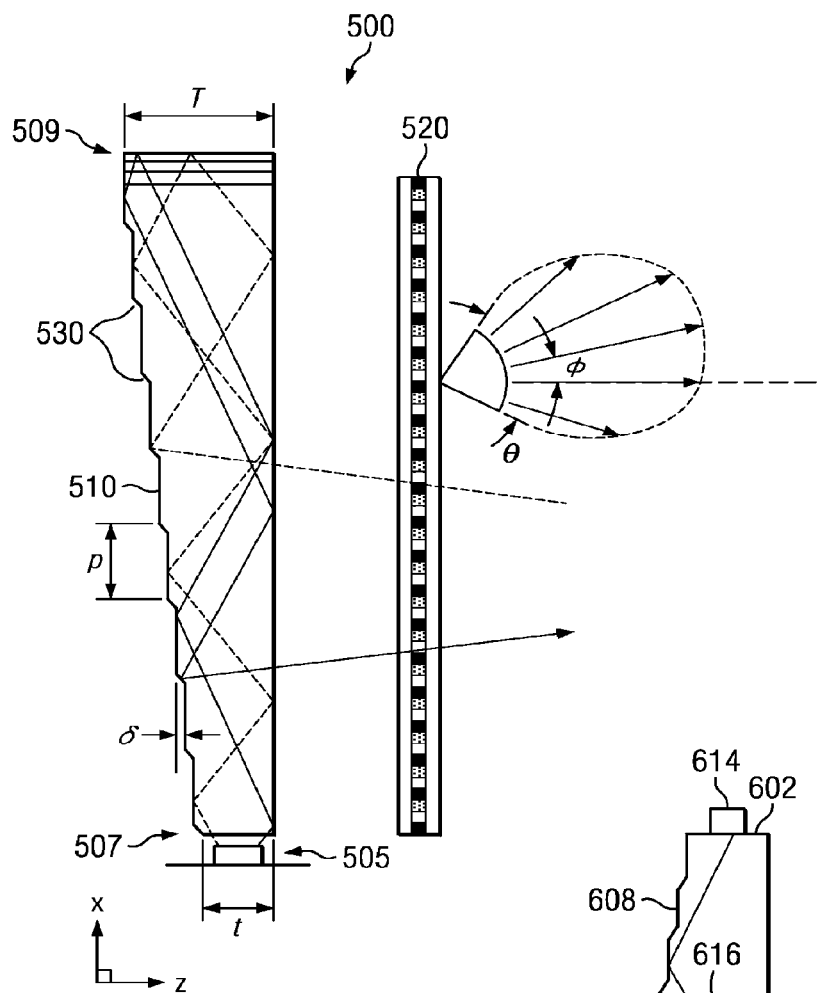
FIG. 5C is a schematic diagram showing a second side view of the optical valve structure of FIG. 5A, in accordance with the present disclosure.

FIG. 5A is a schematic diagram showing a top view of an optical valve structure illustrating a directed output in the yz plane, FIG. 5B is a schematic diagram illustrating a first side view of the optical valve structure of FIG. 5A and FIG. 5C is a schematic diagram showing a second side view of the optical valve structure of FIG. 5A.

The top view 550 of FIG. 5A is illustrated in the xy plane and includes LED 505 which may be used to illuminate the optical valve 510. The second side view 500 of FIG. 5C is illustrated in the xz plane and includes LED 505, LCD 520, and optical valve 510. The side view 525 of FIG. 5B is an alternative view of top view 550 of FIG. 5A and also includes LED 505, LCD 520, extraction features 530 and optical valve 510. Accordingly, the LED 505 of FIGS. 5A, 5B, and 5C may correspond to one another and the optical valve 510 of FIGS. 5A, 5B, and 5C may correspond to one another. Further, as illustrated in FIG. 5B, the optical valve 510 may have a thin end 507 and a thick end 509. The thick end 509 may thus form a concave or convex mirror.

As illustrated in FIG. 5C, the thickness t of the entrance of the optical valve 510, and thickness T also of the optical valve 510 may be determined at least by system etendue and efficiency respectively. The system etendue in the yz plane may be determined by the vertical y extent of the exit pupil or eyebox, as shown in FIG. 5B. By way of example, it may be desirable that a vertical window extent be approximately $\Delta/2$, in which $\Delta$ may be approximately the distance between eye and display, typically 300 mm. The xz angular extent $\theta$ may then be approximately $2\cdot\tan^{-1}(\frac{1}{4})$ or approximately 30° which may translate to an internal xz angle of approximately $\theta/n$ spread of approximately 20° about the x-axis. Typical output spread of an LED in air may be approximately 100° and in the guide may be approximately 65°. Thus, to approximately match, the LED angular extent must be approximately halved. Etendue conservation may provide that the approximate size t of the guide entrance may then be approximately twice the size of the LED emitting area assuming a suitable beam expander, such as a tapered waveguide, is used. Typical LEDs for small platforms can be approximately 0.5 mm wide which may provide for the size of the entrance aperture as approximately t=~1 mm.

The ratio of the exit aperture size T to the entrance size t may be employed to determine a loss in efficiency since returning light hitting the entrance aperture may be effectively lost from the system. The minimum size may then be approximately 2 mm for approximately 50% efficiency, though T~3 mm may provide a better efficiency/thickness trade-off.

The number of extraction features may be limited primarily by the resulting form of the extraction features after manufacturing. Practical extraction features may include manufacturing errors from using practical manufacturing methods. These errors may typically have a finite size related for example to the size of the cutting tool that made the mold. In the case the extraction feature is small, the error may be a larger fraction of the overall extraction feature and may cause less than optimal performance. A sensible size for the extraction features may thus be chosen so that the extraction feature size may be compatible with the expected final form or fidelity. The fewer in number of the extraction features, the larger the feature size, and the less relatively rounded the edges. Round edges may tend to expand the angular extent of propagating light within the optical valve and can cause unwanted leakage. Assuming a feasible step size $\delta$ of approximately 10 μm, the number Ns of steps may then be approximately $(T-t)/\delta\sim200$. In the example of a mobile phone display in landscape stereoscopic mode, the step pitch p may be d/Ns~250 μm. Typical mobile phones may have 78 μm pixel pitch so diffusing of the output light along x may be introduced to avoid Moire effects. To approximately preserve to first order the vertical extent of the exit pupil and yet scramble the outgoing optical field, a diffusing angle of approximately 30° may be sufficient. 1D holographic diffusers, for example, by Luminit (a company based in Torrance, Calif.) may be employed to achieve this effect.

The curved mirrored surface may perform similar to a 1D imaging element. Localized light boxes or exit pupils may be formed in the plane of the viewer through the one dimensional imaging of the distinct LEDs. The imaging condition may be approximately described by the usual formula $1/u+1/v=1/f$, assuming minimal sag of the curved reflecting surface which may also be known as the thin lens assumption. Where f is the focal distance of the curved reflecting surface which may be approximately equal to half its radius of curvature r, u is the distance d of the LEDs to the end face and v is the optical path length to the viewer which may be approximately n·Δ. The radius of curvature may then be:

$$r = \frac{2\cdot d\cdot n\cdot\Delta}{(n\cdot\Delta + d)}$$

For typical mobile phone values, r may be approximately 90 mm.

In another case in which the sag of the curved surface is significant, the radius of curvature may be:

$$r = 2 \cdot d \cdot \frac{(2 \cdot \Delta \cdot n + d)}{(3 \cdot d + 2 \cdot \Delta \cdot n)}$$

Figure 11:
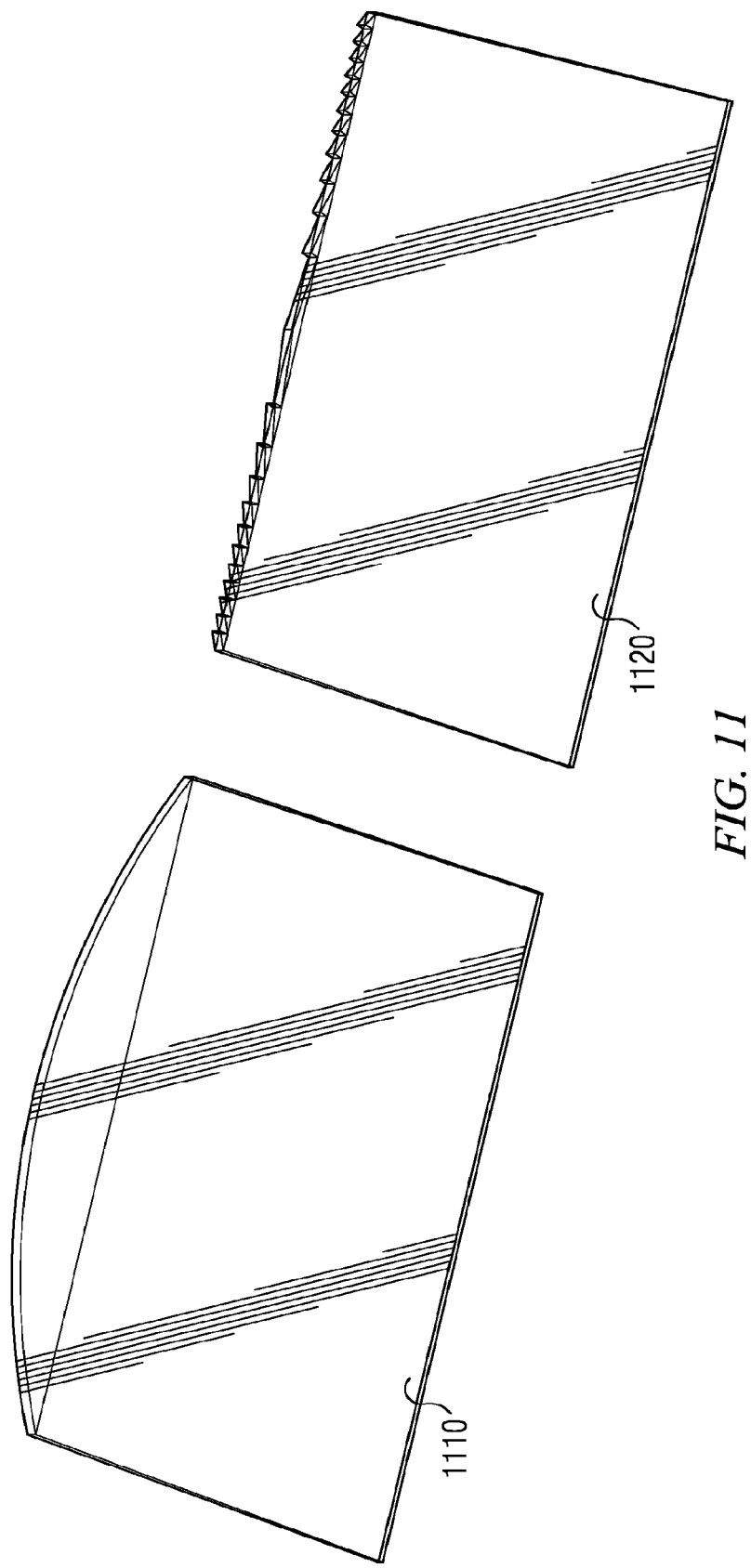
FIG. 11 is a schematic diagram illustrating an optical valve with a Fresnel equivalent reflecting surface, in accordance with the present disclosure.

The embodiment illustrated in FIGS. 5A, 5B, and 5C may create an eyebox, which may be effectively a magnified version of the LEDs. Again from geometrical lens considerations the ratio of the eyebox size Σ/s may be approximately equivalent to the geometrical ratio nΔ/d~5. The position of the eyebox may be scaled similarly from the approximate LED position which may be determined by Ω/ω=Σ/s~5. To provide head position flexibility the eyebox may be approximately the width of the inter-ocular distance or approximately 65 mm with minimal gap between the emitting regions of the two LEDs. In this example case, each LED emitting area may extend from the middle of the thin end to approximately 65/5 or approximately 13 mm. The curved cylindrical lens surface may be replaced by a Fresnel equivalent as shown in FIG. 11 and which will be discussed in further detail herein. However, while this may reduce the extent to which the end surface may exceed the final display area, it may also add cost.

Figure 6:
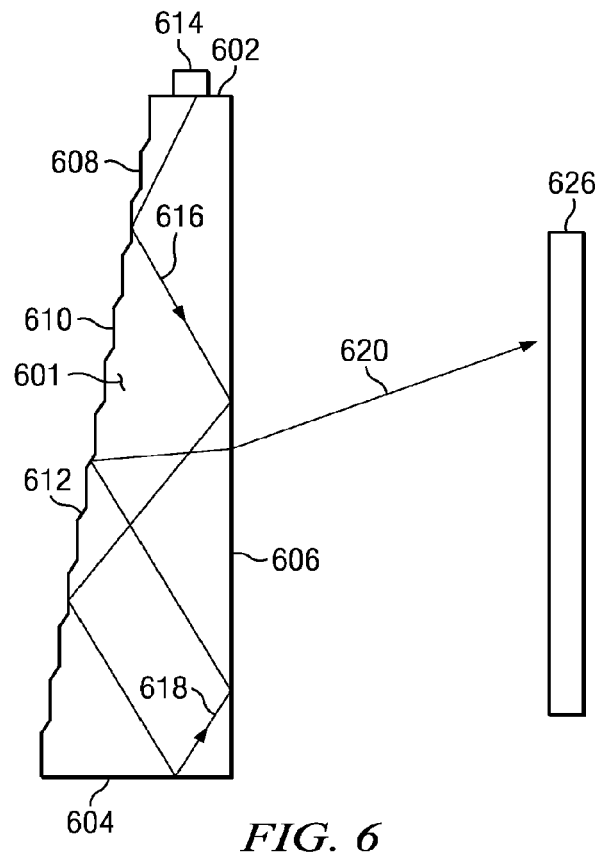
FIG. 6 is a schematic diagram illustrating in cross section an optical valve, in accordance with the present disclosure.

FIG. 6 is a schematic diagram illustrating another embodiment in cross section of an optical valve. FIG. 6 shows in cross section an embodiment which includes an optical valve 601 which may be a transparent material. In the embodiment of FIG. 6, the optical valve 601 has an illumination input side 602, a reflective side 604, a first light directing side 606 which is plane, and a second light directing side 608 which includes guiding features 610 and light extraction features 612. As shown in FIG. 6, light rays 616 from an illumination element 614 of an array 615 of illumination elements, may be substantially guided in the optical valve 601 by means of total internal reflection by the side 606 and total internal reflection by the guiding feature 610, to the reflective side 604 which may be a mirror surface. The array 615 of illumination elements may be, in one example, an addressable array of LEDs. Generally, in FIGS. 6-25, similarly numbered elements may correspond to one another. For example, the optical valve in FIG. 6 may be labeled 601, the optical valve in FIG. 7A may be labeled 701, the optical valve of FIG. 13 may be labeled 1301 and so forth.

Continuing the discussion of FIG. 6, light ray 618 may be reflected by the side 604 and may be further substantially guided in the optical valve 601 by total internal reflection at the side 604 and may be reflected by guide features 612. Rays 618 that may be incident on extraction features 612 may be deflected away from guiding modes of the optical valve and may be directed as shown by ray 620 substantially through the side 604 to an optical pupil that may form a viewing window 626 of an autostereoscopic display. The width of the viewing window 626 may be primarily determined by the size of the illuminator, output design distance and optical power in the side 604 and features 612. The height of the viewing window may be primarily determined by the reflection cone angle of the features 612 and the illumination cone angle input at the input side.

The optical valve of FIG. 6 may be formed for example by means of molding in one piece, or by attachment of molded films comprising the features 610, 512, to a wedge shaped structure with ends 602, 604. The optical valve 601 may be formed using singly or in combination materials such as glass or polymer materials such as, but not limited to, acrylic or PET. Advantageously optical valves of the present embodiments can be formed with low cost and high transmission.

Figure 7A:
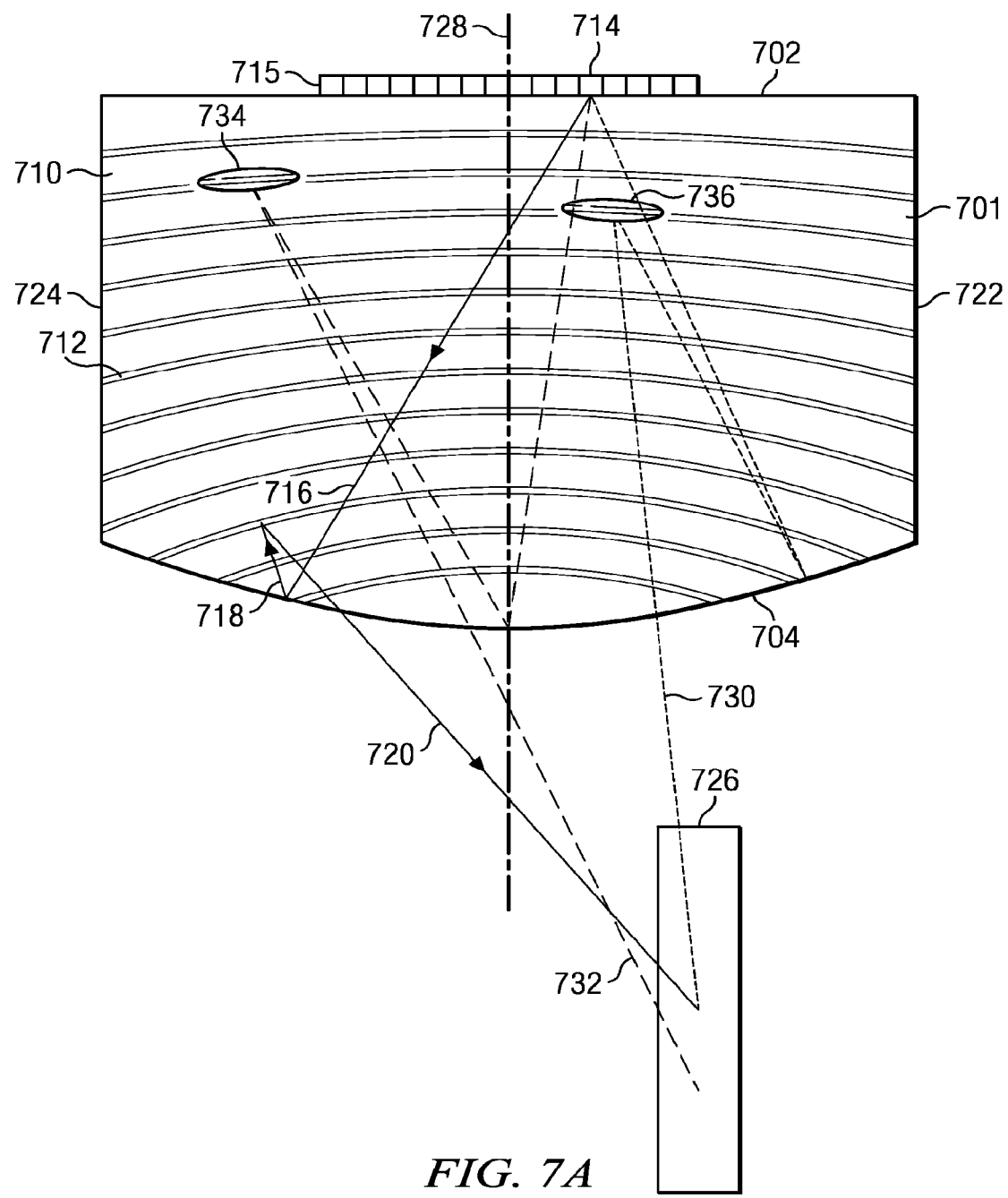
FIG. 7A is a schematic diagram illustrating in schematic plan view an optical valve which may be illuminated by a first illumination element and including curved light extraction features, in accordance with the present disclosure.

FIG. 7A is a schematic diagram illustrating in schematic plan view an optical valve illuminated by a first illumination element and including curved light extraction features. FIG. 7A illustrates in plan view further guiding of light rays from light emitting element 714 in the optical valve 701. Each of the output rays may be directed towards the same viewing window 726 from the respective illuminator 714. Thus, light ray 730 of FIG. 7A may intersect the ray 720 in the window 726, or may have a different height in the window as shown by ray 732. Sides 722, 724 of the optical valve may be, but are not limited to, transparent, mirrored, serrated, blackened surfaces, and so forth.

Continuing the discussion of FIG. 7A, the light extraction features 712 may be elongate and curved and the orientation of light extraction features 712 in a first region 734 of the light directing side 708 may be different to the orientation of light extraction features 712 in a second region 736 of the light directing side 708.

Figure 7B:
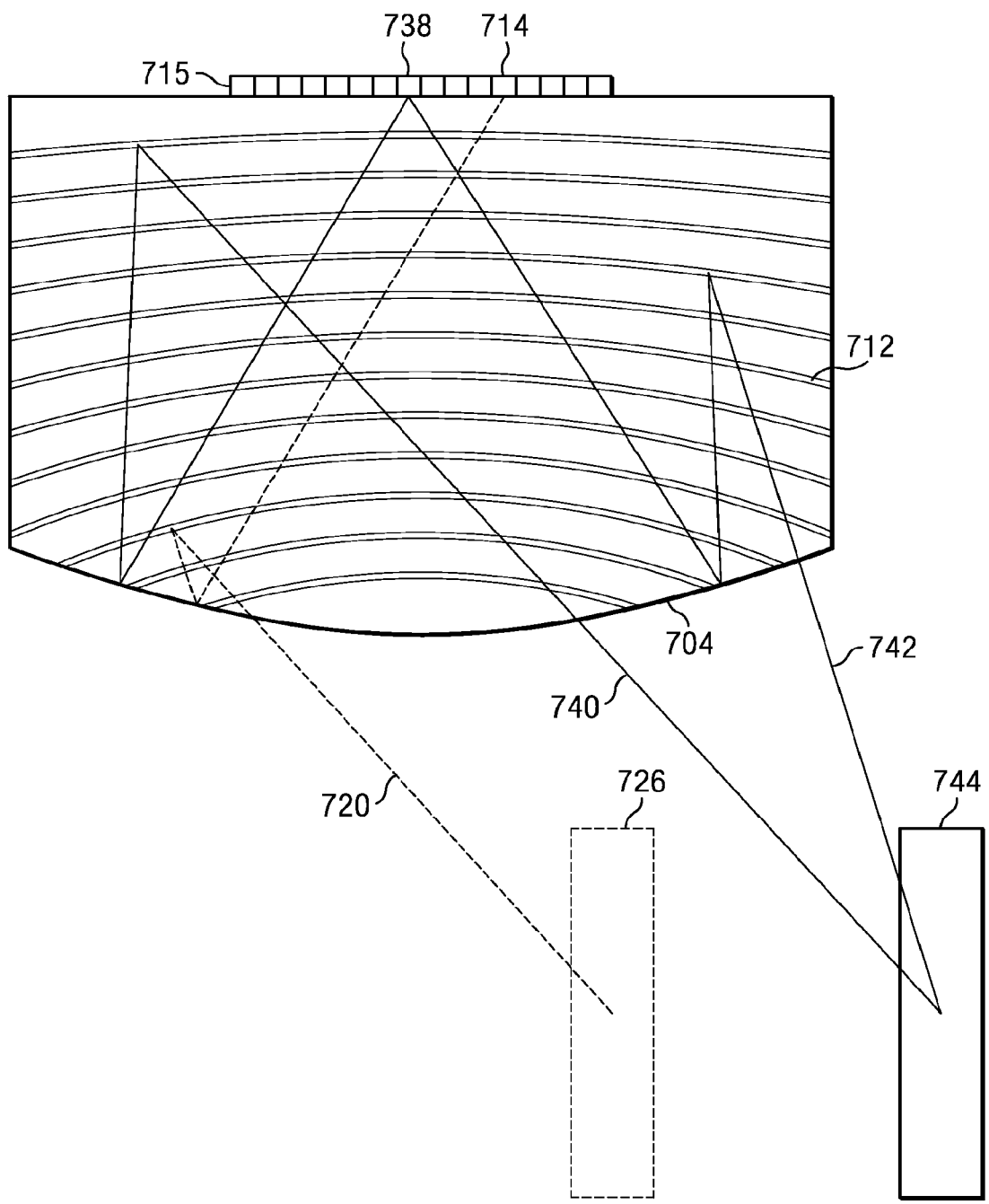
FIG. 7B is a schematic diagram illustrating in schematic plan view an optical valve which may be illuminated by a second illumination element, in accordance with the present disclosure.

FIG. 7B is a schematic diagram illustrating in schematic plan view an optical valve illuminated by a second illumination element. FIG. 7B includes the light rays 740, 742 from a second illuminator element 738 of the array 715. The curvature of the mirror on the side 704 and the light extraction features may cooperate to produce a second viewing window 744 which may be laterally separated from the viewing window 726 with light rays from the illuminator 738.

The embodiment of FIGS. 7A and 7B may provide a real image of the illuminator element 714 at a viewing window 726 whereas the real image may be formed by cooperation of optical power in reflective side 704 and optical power which may arise from different orientations of elongate light extraction features 712 between regions 734 and 736. Further, the embodiment of FIGS. 7A and 7B may achieve improved aberrations of the imaging of light emitting element 714 to lateral positions in viewing window 726. Improved aberrations may achieve an extended viewing freedom for an autostereoscopic display while achieving low cross talk levels. In one example, extended viewing freedom may include larger angles over which 3D can be viewed with good performance or low cross-talk which may be less than approximately 5%.

Figure 7C:
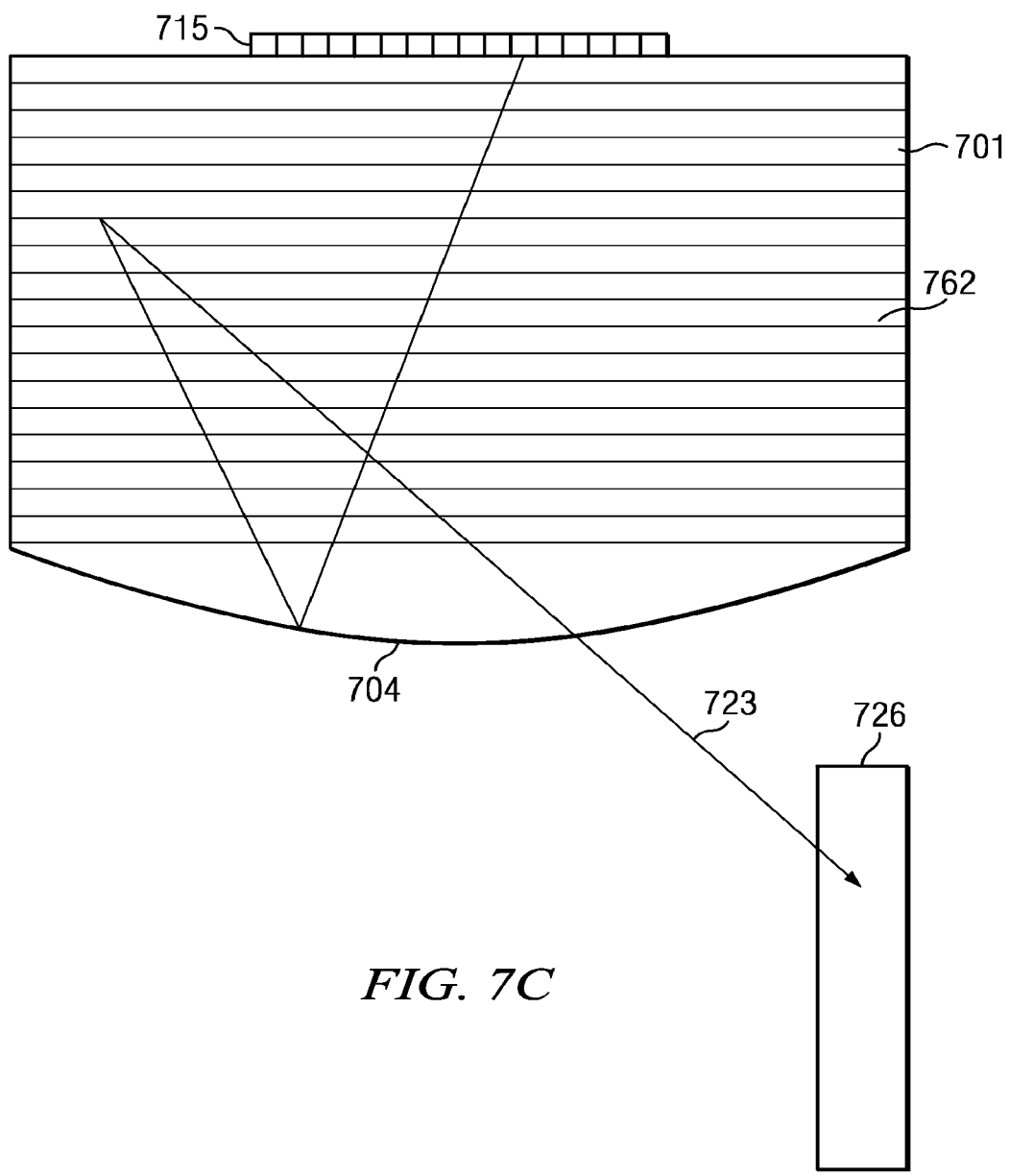
FIG. 7C is a schematic diagram illustrating in schematic plan view an optical valve which may include linear light extraction features, in accordance with the present disclosure.

FIG. 7C is a schematic diagram illustrating in schematic plan view an optical valve which may include linear light extraction features. FIG. 7C shows a similar arrangement to FIGS. 4A and 4B in which the light extraction features are linear and substantially parallel to each other. The embodiment of FIG. 7C may provide substantially uniform illumination across a display surface and may be more convenient to manufacture than the curved features of FIGS. 7A and 7B.

Figure 8:
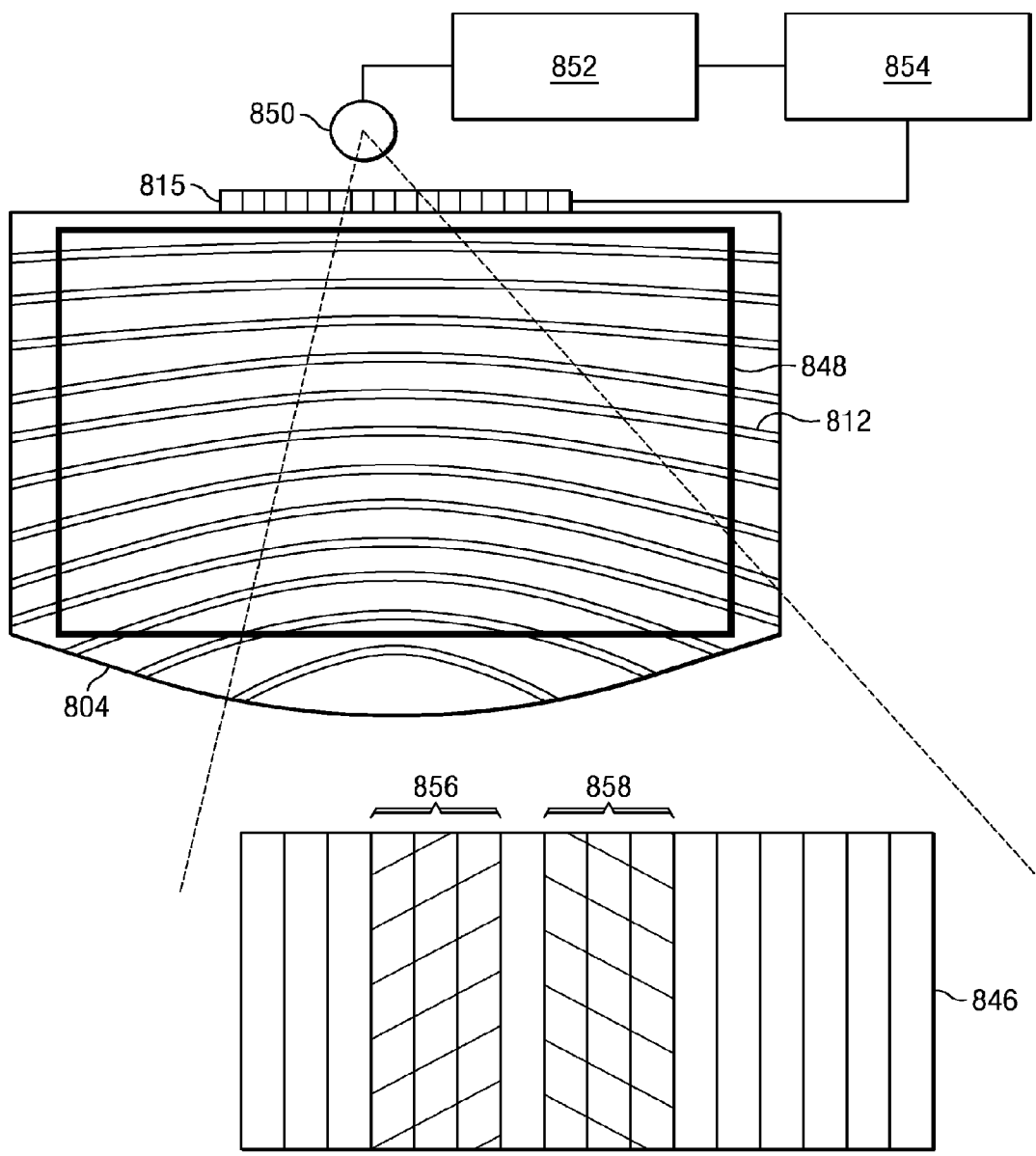
FIG. 8 is a schematic diagram illustrating an autostereoscopic display apparatus using the optical valve, in accordance with the present disclosure.

FIG. 8 is a schematic diagram illustrating an autostereoscopic display apparatus using the optical valve. FIG. 8 shows an observer tracking autostereoscopic display apparatus. As shown in FIG. 8, an array 815 of illumination elements and optical valve 801 may be arranged to provide an array 846 of viewing windows. A sensor 850 such as a CCD or CMOS sensor may be employed to sense an observer in the vicinity of the windows and an observer tracking system 852 may be used to calculate observer position. An illuminator controller 854 may determine the correct setting of the illuminator array so that illuminator elements corresponding to viewing window set 856 may be illuminated during a first illumination phase and illuminator elements corresponding to viewing window set 858 may be illuminated in a second illumination phase. The controller 854 may adjust which illumination elements of array 815 are illuminated depending on the observer position. Image display may be provided by a transmissive spatial light modulator display 848, such as an LCD, and may be located between the optical valve 801 and the viewing window array 846. In a first illumination phase which may correspond to illumination of window array 856, a left eye image may be presented on the display 848, and in a second phase which may correspond to illumination of window array 858, a right eye image may be presented on the display 848.

The embodiment of FIG. 8 can achieve a wide viewing freedom observer tracking autostereoscopic display with low levels of flicker for a moving observer. The optical quality of the windows of the array 846 can be improved by the varying orientation of extraction features 812 across the optical valve. Thus the illumination uniformity in the window plane can be optimized in addition to the cross talk for an observer. This embodiment may provide a thin optical valve that can be configured as a directional backlight with LCDs in thin packages. Further, the embodiment of FIG. 8 may not employ additional light steering films as the output may be directed in a substantially forward direction. Additionally, the efficiency of the optical valve may be varied by using mostly TIR reflections rather than reflections from metalized surfaces. The light extraction may be substantially through the light directing side 804, as the light losses through the light side 808 may be substantially lower.

FIG. 9 is a schematic diagram illustrating an optical valve including a planar reflective side. FIG. 9 shows a further embodiment of the optical valve which includes a plane reflective side 904. Light extraction features 912 may be configured to substantially direct light rays 960 from the light emitting element array 915 to the window array 946. However, the side 904 may be a reflective surface such as a mirror which may have little to no optical power, so the optical power may be provided by light extraction features 912. The embodiment of FIG. 9 may achieve a small total area of optical valve that can be approximately matched to area of the spatial light modulator. This may reduce total display size. Specifically, the approximate area under the sag of the curvature of side 904 may be substantially eliminated.

Figure 10A:
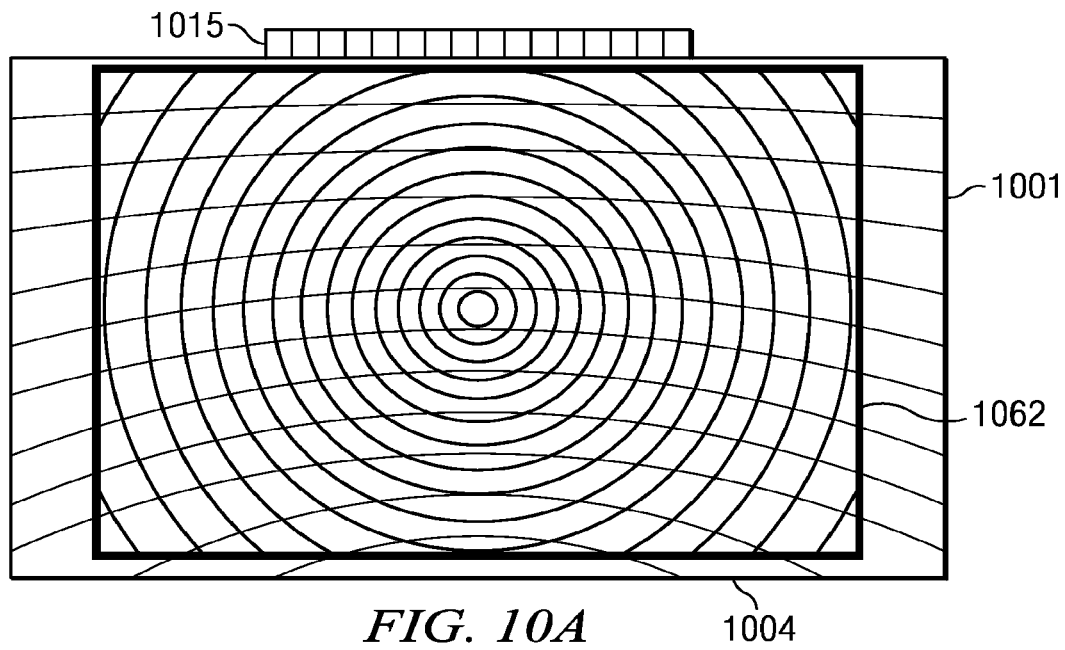
FIG. 10A is a schematic diagram illustrating an optical valve including a Fresnel lens, in accordance with the present disclosure.
Figure 10B:
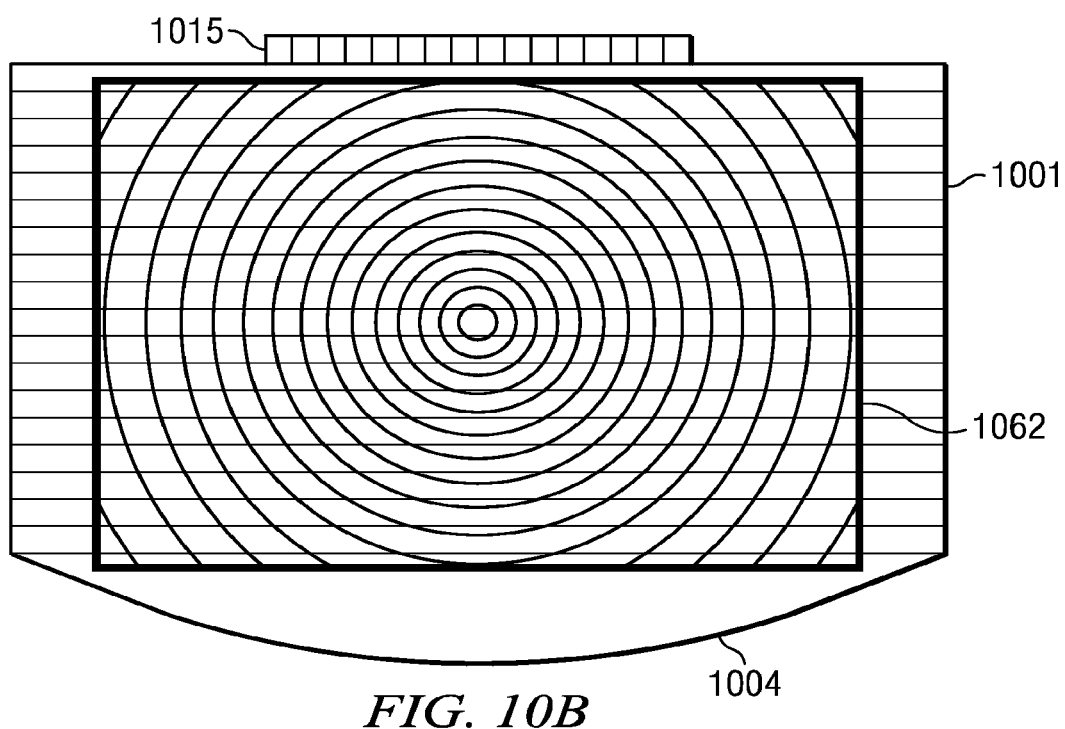
FIG. 10B is a schematic diagram illustrating an optical valve including another Fresnel lens, in accordance with the present disclosure.

FIG. 10A is a schematic diagram illustrating an optical valve including a Fresnel lens and FIG. 10B is also a schematic diagram illustrating an optical valve including another Fresnel lens. FIGS. 10A and 10B show further embodiments in which an additional Fresnel lens 1062 may be positioned at the output of the optical valves with planar and curved sides 1004 respectively. The Fresnel lens may be configured to cooperate with the side 1004 and light extraction features 1012 to substantially direct light from the array 1015 of illumination elements to the viewing windows array (not shown in FIGURES). The Fresnel lens may have a spherical or cylindrical form, in which the form may depend on the vertical height of window (not shown in FIGURES). Additionally, the optical power of the optical valve can be distributed between the side 1004, the light deflection features 1012 and the Fresnel lens, which may reduce degradations of window structure in the array of windows (not shown in FIGURES), so increasing viewing freedom and reducing image cross talk while maintaining low levels of flicker for a moving observer in the window plane.

Figure 10C:
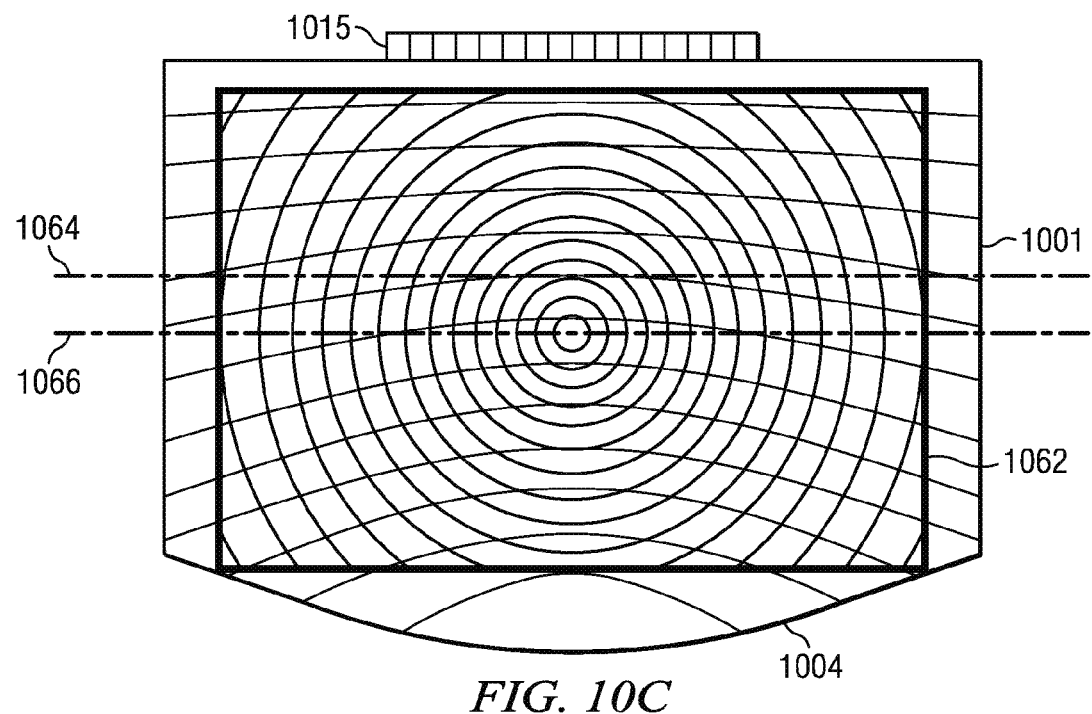
FIG. 10C is a schematic diagram illustrating a further optical valve including another Fresnel lens, in accordance with the present disclosure.

FIG. 10C is a schematic diagram illustrating a further optical valve including another Fresnel lens. In FIG. 10C, the Fresnel lens 1062 axis may be offset compared to the center of the optical valve so that the axis 1064 of the center of the display may be in a different location to the axis 1066 of the center of the lens. The embodiment of FIG. 10C may shift the nominal output light direction from the extraction features to be more on-axis than may otherwise be the case. Further, the embodiment of FIG. 10C may provide a brighter display as it may not employ vertical diffusion to provide adequate on-axis brightness.

FIG. 11 is a schematic diagram illustrating an optical valve with an alternative reflective end. As shown in FIG. 11, an optical valve may have a curved surface or conventional collimating wedge 1110, which may be replaced with a Fresnel equivalent 1120.

Figure 12:
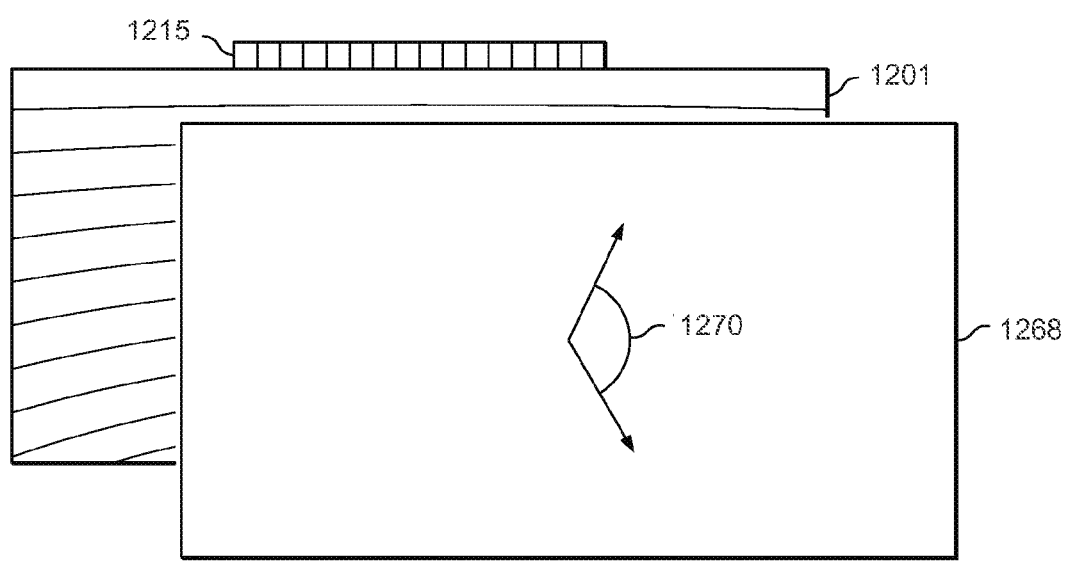
FIG. 12 is a schematic diagram illustrating an optical valve including a vertical diffuser, in accordance with the present disclosure.

FIG. 12 is a schematic diagram illustrating an optical valve including a vertical diffuser. FIG. 12 shows a further embodiment in which a vertical diffuser 1268 may be arranged to provide diffusion for an input ray 1220 into a cone angle 1270 which may increase the vertical height of the windows without significantly increasing scatter in the horizontal direction. Additionally, the vertical viewing angle may be increased without increasing cross talk between adjacent windows in the array 1246. The vertical diffuser may be various types of materials including, but not limited to an asymmetric scattering surface, relief structure, a lenticular screen, and so forth. The vertical diffuser may be arranged to cooperate with a Fresnel lens which may provide high display uniformity for rotation about a horizontal axis.

Figure 13:
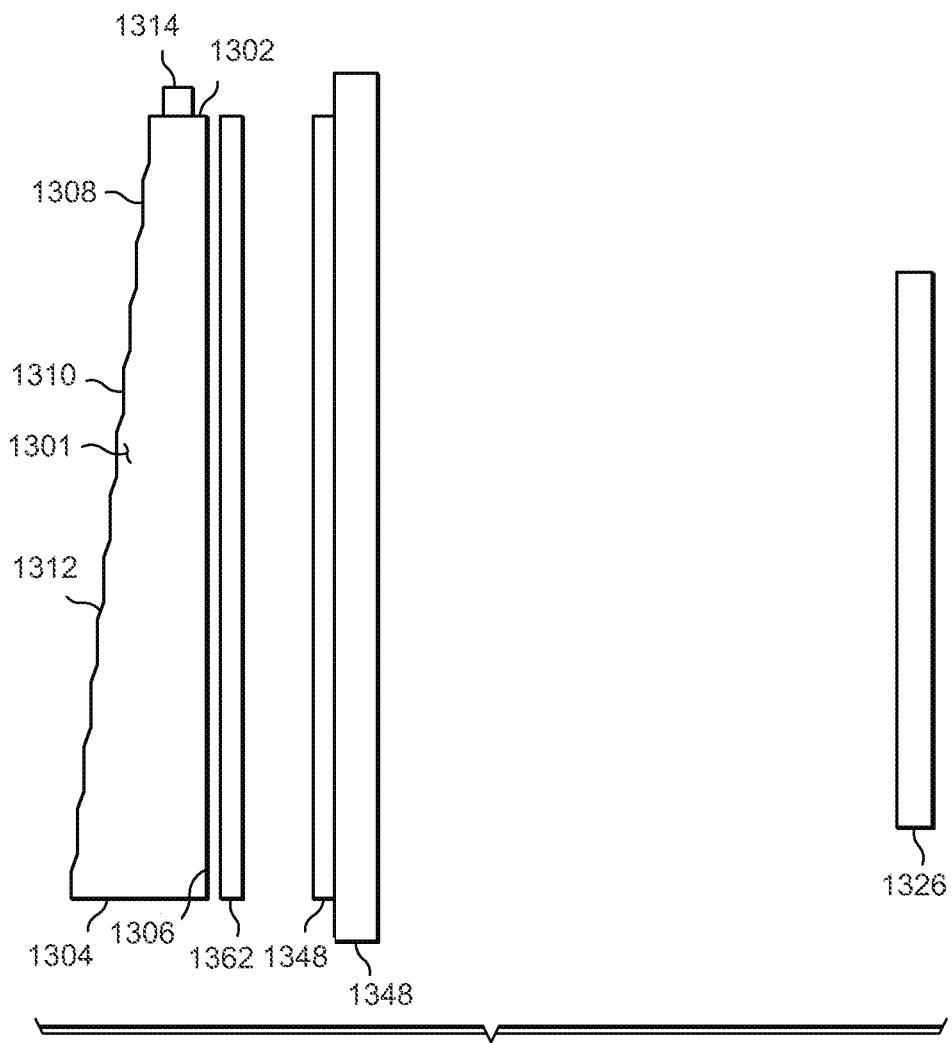
FIG. 13 is a schematic diagram illustrating in cross section an autostereoscopic display, in accordance with the present disclosure.

FIG. 13 is a schematic diagram illustrating in cross section an autostereoscopic display. FIG. 13 shows an autostereoscopic display including the optical valve 1, Fresnel lens 1362, vertical diffuser 1368 and transmissive spatial light modulator 1348 may be arranged to provide an autostereoscopic viewing window 1326 from an illuminator element of the illuminator array 1314. A gap may be provided between the diffuser 1368 and Fresnel lens 1362 to reduce Moire beating between the spatial light modulator 1348 and the structures of the Fresnel lens 1362 and light extraction features 1312.

Figure 14:
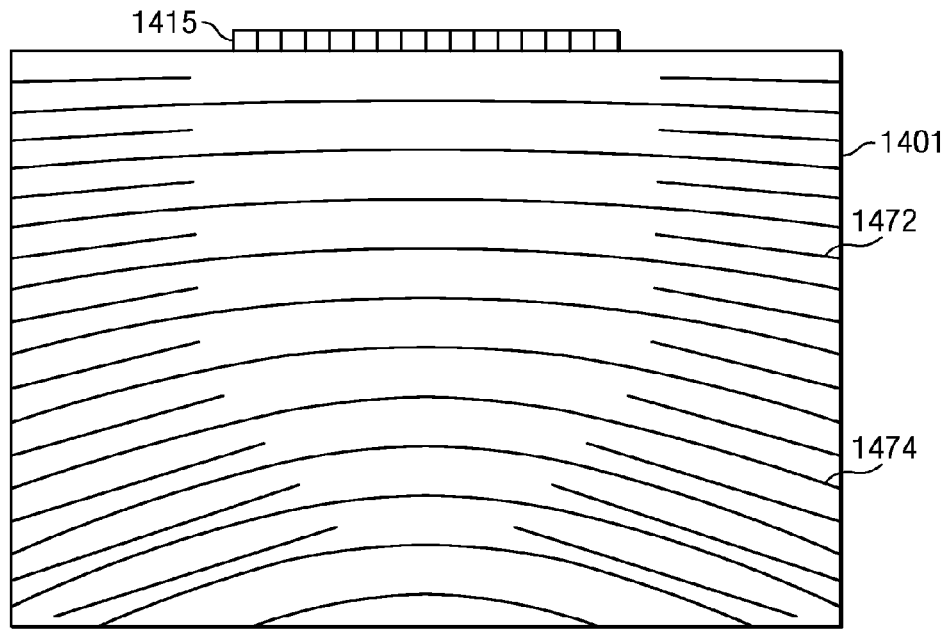
FIG. 14 is a schematic diagram illustrating an optical valve including separated elongate light extraction features, in accordance with the present disclosure.

In some embodiments, the density of light extraction features 1312 in regions at the edge of the optical valve 1301 may be lower than the density in the centre of the optical valve 1301. Such an arrangement may result in non-uniform intensity across the area of the display apparatus. FIG. 14 is a schematic diagram illustrating an optical valve including separated elongate light extraction features. FIG. 14 shows that additional separated elongate light extraction features 1472 may be arranged, for example, between continuous light extraction features 1474 to advantageously achieve higher display intensity uniformity.

Figure 15:
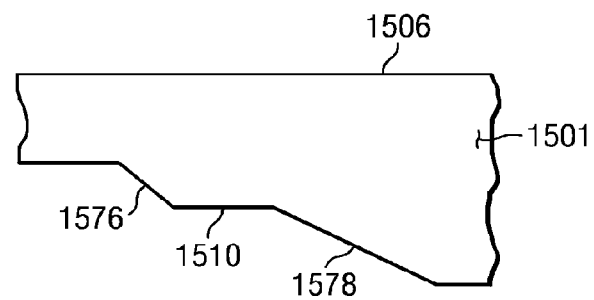
FIG. 15 is a schematic diagram illustrating a cross section of an optical valve including light extraction features with variable slope and height, in accordance with the present disclosure.

FIG. 15 is a schematic diagram illustrating a cross section of an optical valve including light extraction features with variable slope and height. FIG. 15 shows in cross section a schematic arrangement of light extraction features and guiding features 1576, 1578 in which the height and slope of the light extraction features may vary across the second light directing side 1508. Advantageously the slope may be adjusted to provide vertical diffusion characteristics, while the height may be varied to adjust the amount of light that may be extracted from the optical valve for a particular region.

Figure 16A:
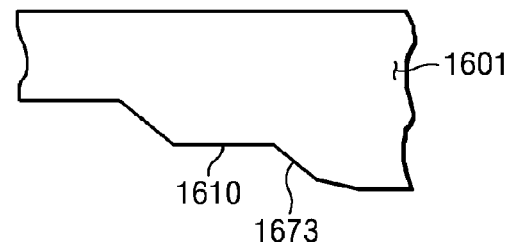
FIG. 16A is a schematic diagram illustrating a cross section of an optical valve including light extraction features with multiple reflecting facets for the light extraction features, in accordance with the present disclosure.
Figure 16B:
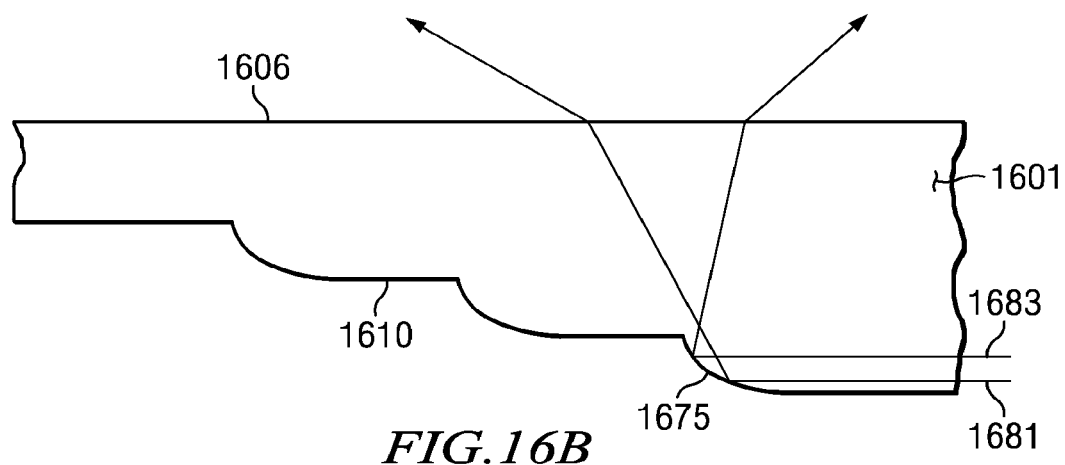
FIG. 16B is a schematic diagram illustrating a cross section of an optical valve including light extraction features with convex facets for the light extraction features, in accordance with the present disclosure.
Figure 16C:
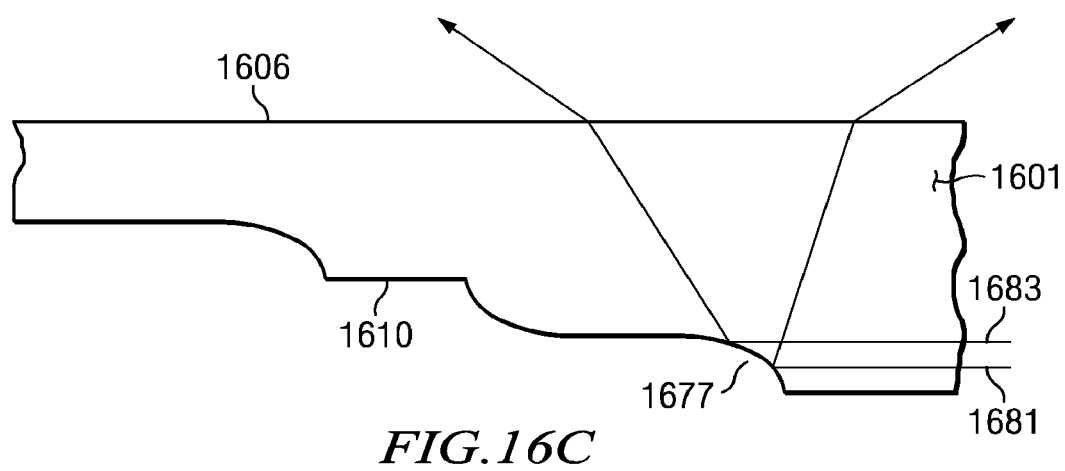
FIG. 16C is a schematic diagram illustrating a cross section of an optical valve including light extraction features with convex and concave facets for the light extraction features, in accordance with the present disclosure.
Figure 16D:
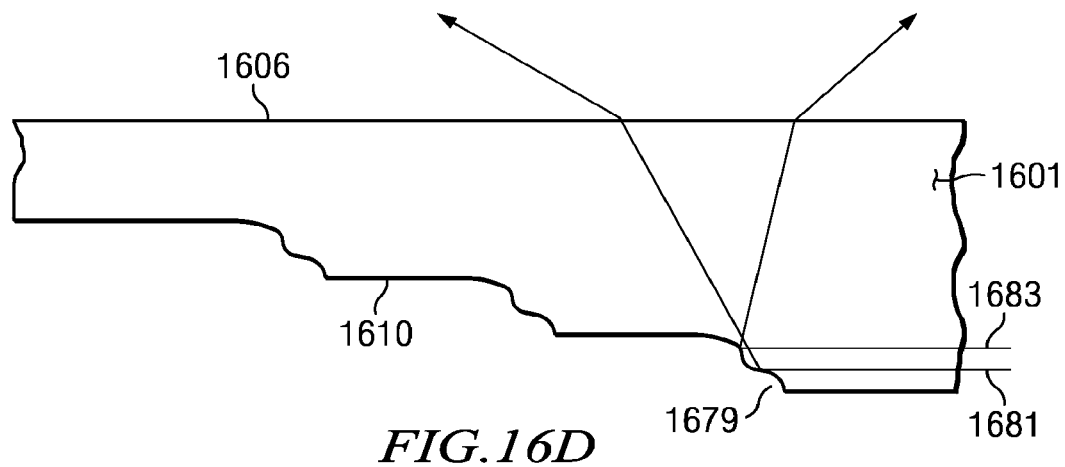
FIG. 16D is a schematic diagram illustrating a cross section of an optical valve including light extraction features with irregular facets for the light extraction features, in accordance with the present disclosure.

FIG. 16A is a schematic diagram illustrating a cross section of an optical valve including light extraction features with multiple reflecting facets for the light extraction features. FIG. 16A is an embodiment in which the light extraction features 1673 may be provided by multiple plane surfaces. FIG. 16B is a schematic diagram illustrating a cross section of an optical valve which may include light extraction features with convex facets for the light extraction features. FIG. 16B shows one configuration of convex light extraction features 1675, while FIG. 16C illustrates a combination of convex 1675 and concave 1677 light extraction features. FIG. 16C is a schematic diagram illustrating a cross section of an optical valve including light extraction features with convex and concave facets for the light extraction features. FIG. 16D is a schematic diagram illustrating a cross section of an optical valve including light extraction features with irregular facets for the light extraction features. FIG. 16D shows one embodiment providing irregular feature 1612 shapes. The embodiments of FIGS. 16A, 16B, 16C, and 16D may provide vertical diffusion characteristics without employing the vertical diffuser 1668, thus reducing cost and complexity.

Figure 16E:
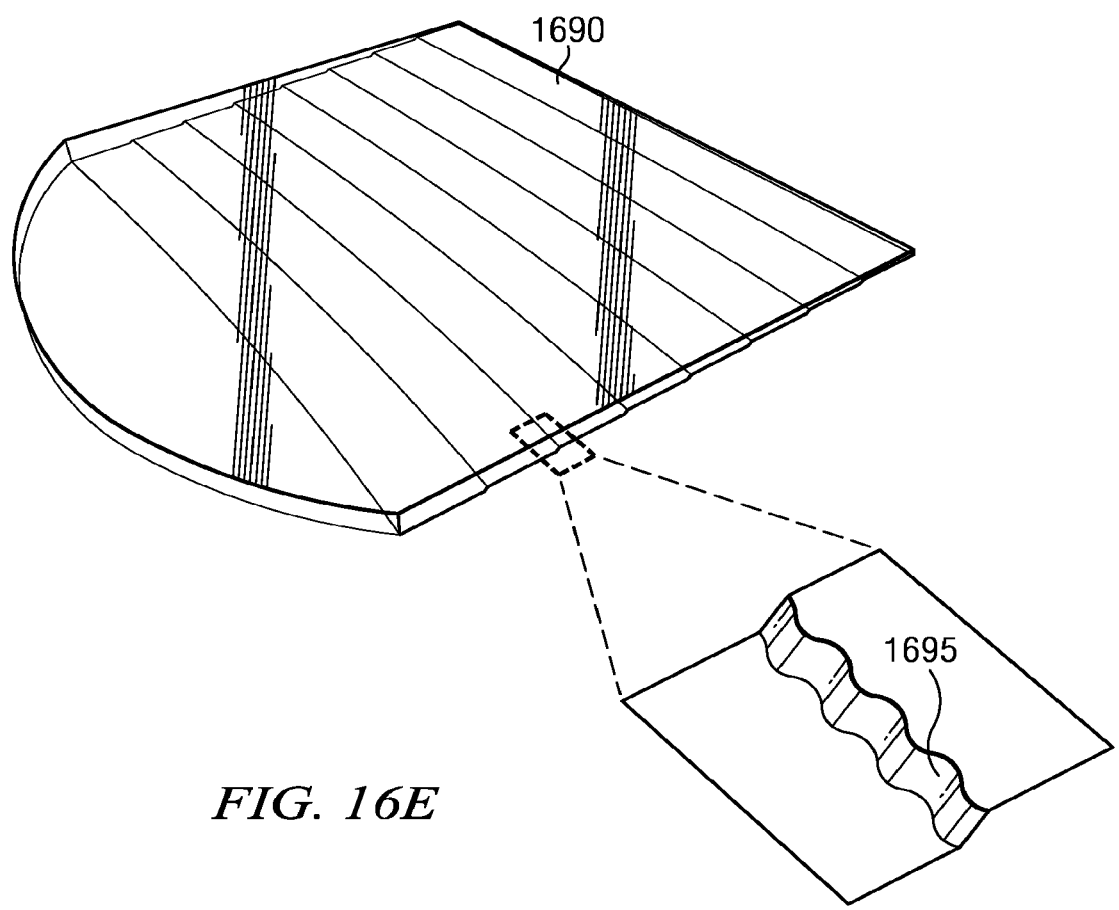
FIG. 16E is a schematic diagram illustrating a cross section of an optical valve including light extraction features arranged to provide limited scatter in the imaging direction, in accordance with the present disclosure.

FIG. 16E is a schematic diagram illustrating a cross section of an optical valve 1690 including light extraction features arranged to provide limited scatter in the imaging direction. FIG. 16E shows a further embodiment in which the light extraction features have a surface modulation 1695 on the extractor faces which may be for the purpose of light diffusion and arranged such that lateral diffusion may be achieved in the window plane. The cone angle of the diffusion may be used to provide some lateral blurring of the window structure, but may be much lower than that used for vertical diffusion. Such an arrangement may be used to increase window uniformity and reduce display flicker for a moving observer.

Figure 17:
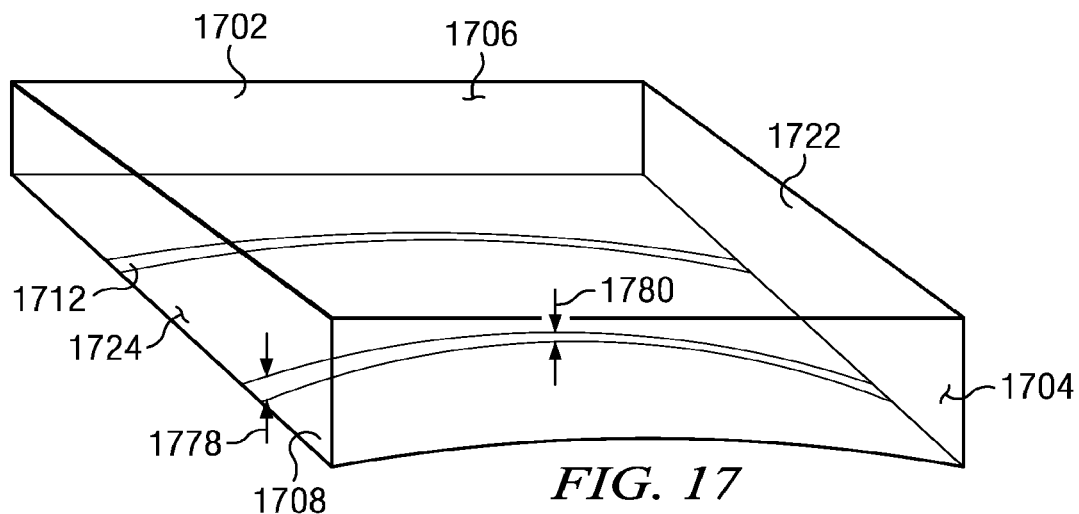
FIG. 17 is a schematic diagram illustrating a sketch of a variable lateral thickness optical valve, in accordance with the present disclosure.

FIG. 17 is a schematic diagram illustrating a sketch of a variable lateral thickness optical valve. FIG. 17 shows a schematic arrangement of optical valve 1701 (not marked) in which the height of the extraction features 1712 may vary across the width of the optical valve 1701 which may provide a higher extraction uniformity across the area of side 1706. Thus, height 1778 of the features 1712 at the edge of the optical valve 1701 may be greater than the height 1780 in the center of the optical valve 1701. In the embodiment of FIG. 17, the light guiding features 1724 may not be parallel to each other or the surface 1706. The orientation of the features 1712 may be adjusted to compensate for such a change in surface normal direction for the light guiding features 1710.

Figure 18:
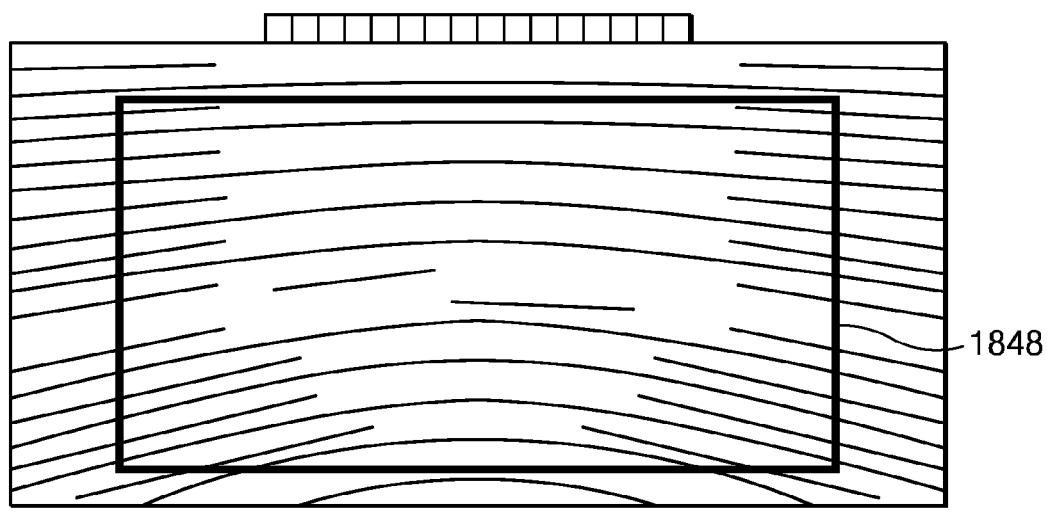
FIG. 18 is a schematic diagram illustrating a plan view of a directional display including an optical valve with a plurality of separated light extracting features arranged to provide reduction of Moiré patterning, in accordance with the present disclosure.

FIG. 18 is a schematic diagram illustrating a plan view of a directional display including an optical valve which may have a plurality of separated light extracting features and which may be arranged to provide reduction of Moiré patterning. FIG. 18 shows schematically a random arrangement of elongate light extraction features arranged such that the features may reduce Moiré between the light extraction features and the pixelated spatial light modulator. Moire patterning may be visible when two periodic semi-transparent structures are placed in close proximity. The introduction and random placement of extraction features may break an/or interrupt any periodicity and may reduce visible Moiré effects.

FIG. 19 is a schematic diagram illustrating light imaging options provided by the curved reflective side. FIG. 19 illustrates three different examples of light collimation of principal rays. Example a of FIG. 19 illustrates convergent principal rays, example b illustrates collimated principal rays, and example c illustrates divergent principal rays, all of which may be propagating in the second direction after reflecting off the reflective side. Additionally, FIG. 19 shows that the curvature of the reflective side 1904 can be adjusted to substantially control the collimation and/or de-collimation of light reflected within the optical valve 1901. Advantageously a divergent beam as shown in FIG. 19C may provide for the greatest area utilization for off-axis viewing of the optical valve 1901.

FIG. 20 is a schematic diagram illustrating ray paths in an optical valve. The geometry of FIG. 20 may be used to determine the curvature and slope of the optical valve 2001 extraction features that focus collimated principal rays into an approximate point at a viewing plane a, distance V from the display. Additionally, FIG. 20 shows schematically the surface normal and ray directions for the optical valve 2001 structure of the present embodiments.

FIG. 21 is a schematic diagram illustrating an optical valve including a further tilt between the first light directing side and guiding features of the second light directing side.

FIG. 22 is a schematic diagram illustrating in cross section the light rays in a substantially parallel sided optical valve. FIG. 22 shows in cross section an embodiment with no tilt angle between the first light directing surface 2206 and the guiding features 2210 of the second light directing side.

FIG. 23 is a schematic diagram illustrating in cross section the light rays in a tapered optical valve. The embodiment of FIG. 22 includes guiding rays within the optical valve which may be incident on a light extraction feature 2212 of the light directing side 2308 (comprising features 2310, 2312) in which the side 2206 may be substantially parallel to the guiding features 2210. Ray 2282 may be incident on extraction feature 2212 and may be deflected by the facet, but may then be captured by TIR in the optical valve 2201 at the side 2206. Ray 2284 may be extracted as shown; however ray 2286 may also be transmitted through the light extraction feature and as a result may be optically lost. Providing a wedge between the features 2310 and side 2306 may provide additional output coupling light as shown in FIG. 23. In this case, a less steeply inclined light extraction feature 2312 may be arranged so that light for all three incident rays is substantially directed back into the optical valve. As the optical valve may be a narrowing taper for rays travelling in the direction illustrated in FIG. 23, then rays that may be incident on side 2306 may not exceed the critical angle and may thus be output from the optical valve. Further, output coupling films 2388 may be arranged to redirect the light close to the surface of the side 2306 to the on-axis direction of the display. Advantageously such an arrangement may achieve features that are more steeply inclined than parallel sided optical valves. Such features may reflect a higher proportion of the waveguided cone angle within the optical valve without employing additional metalized coatings and may thus be more efficient.

Figure 24:
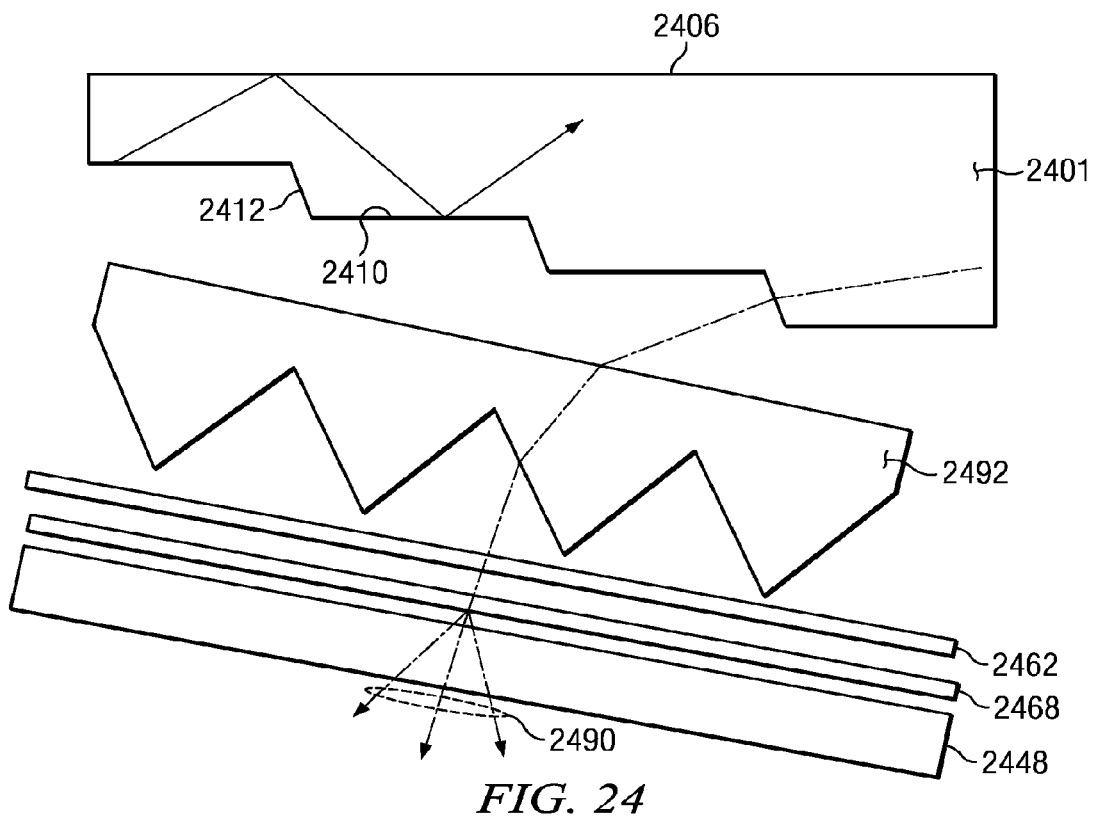
FIG. 24 is a schematic diagram illustrating an autostereoscopic display in which light extraction may be achieved by refraction at the light extraction features of the optical valve, in accordance with the present disclosure.

FIG. 24 is a schematic diagram illustrating an autostereoscopic display in which light extraction may be achieved by refraction at the light extraction features of the optical valve. FIG. 24 shows a further embodiment in which the light extraction features 2412 may be arranged to refract light in the optical valve 2401. A light deflection structure 2492 may include an array of prisms which may be arranged to direct extracted light rays 2490 to a direction that may be substantially normal to the panel output direction. A Fresnel lens 2462 and diffuser 2468 may also be further arranged to direct light onto the panel 2448 such that viewing windows 2426 may be formed, as described previously. In one example, the facet angle may be approximately 90 degrees. Advantageously such an embodiment can achieve high levels of light extraction from the features 2412.

Figure 25:
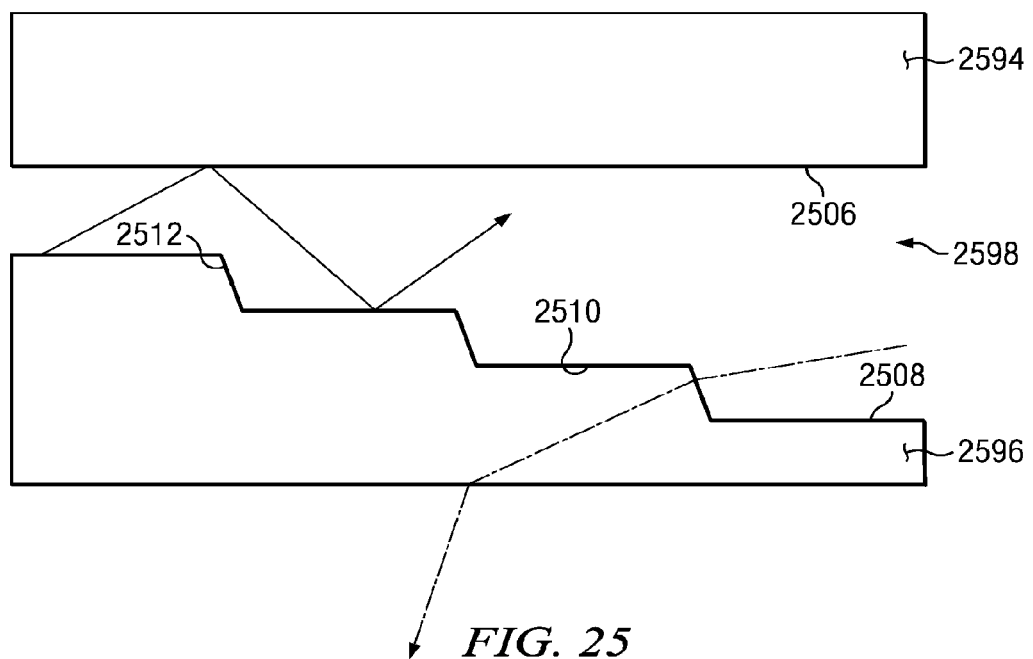
FIG. 25 is a schematic diagram illustrating an optical valve including an air cavity, in accordance with the present disclosure.

FIG. 25 is a schematic diagram illustrating an optical valve including an air cavity. FIG. 25 shows another embodiment in which the optical valve may include an air cavity 2598 with first and second light directing sides 2506 and 2508. The first and second light directing sides 2506 and 2508 may be arranged on support substrates 2594 and 2596 respectively. Sides 2506 and features 2510 may be metalized other than on the extraction features 2512 so that light may be extracted when propagating in the second direction but not when propagating in the first direction. Advantageously such an arrangement may be less easily damaged during handling than the total internal reflection waveguide optical valve 2401 of FIG. 24.

FIGS. 26A and 26B are schematic diagrams showing top and side views, respectively, of an optical valve structure. FIGS. 26A and 26B illustrate another embodiment that may employ curved extraction features which may allow a planar reflecting end surface. Further, in yet another embodiment a curved back reflecting surface and curved extraction features 2610 to avoid excessive light loss at the edges through lack of collimation while reducing the back edge outer curve, may be included. Moreover, other embodiments may break the extraction features into smaller isolated features to substantially avoid aliasing issues with the panel. Each feature may still constitute a designed facet which may provide the approximately correct reflecting angles for the imaging condition while not substantially affecting forward propagating guided light.

The extraction features of an optical valve system may form a series of separated facets. The separated facets may alter the propagation angles of guided light in such a way that total internal reflection (TIR) at the optical valve surface may fail and light may be extracted. In one example, the extraction features may be separated such that the slanted features may have a first slope and may be separated by intervals of guiding features with a second slope, in which the second slope may be a different slope than the first slope of the slanted features.

Another function may include directing the light in a substantially prescribed manner to optimize for angularly controlled illumination. In the discussion with respect to at least FIGS. 5 and 6, the extraction features were presumed as substantially linear, uniformly slanted steps which may act to transform propagation directions from −x to ~z depending on the slope angle. Functions such as focusing, redirection, diffusion, and so forth, may be provided by one or more external films, which can include, but are not limited to, diffusers and Fresnel lenses. Incorporating as many functions into the extraction features can reduce costs and improve performance.

In yet another embodiment a diffuser may be incorporated into any of the optical valve variations discussed herein. Introducing a surface modulation onto the extractor facets as illustrated in FIG. 5 can deflect light approximately into a set of prescribed horizontal and vertical angles which may effectively diffuse the illumination light. Diffusing may be employed to blur the imaging of the physical gaps between LED emission regions. It may also be useful in mixing light between adjacent LED sources to minimize color non-uniformities. The spatial dimensions associated with such diffusing surface modulation may be sufficiently small so that the surface modulation may not be resolved by the system or cause spatial interference with the periodic pixels of an illuminated display. The spatial interference may be partially alleviated by making any modulation aperiodic and pseudo-random.

The extraction features of a light valve directional backlight system may form a series of separated and tilted facets which may alter the propagation angles of guided light in such a way that total internal reflection (TIR) at the guide surface may substantially fail and allow light to escape. The terms separated, tilted, detached, disconnected, and so forth, may be used herein to describe the configuration of the extraction features with respect to one another. In one example, the extraction features may be separated from one another by guiding features. A secondary function may be to direct the light in a prescribed manner to optimize for substantially angularly controlled illumination. In the discussion with respect to at least FIGS. 4A, 4B, 5A, 5B, 5C, the extraction features are presumed substantially linear, uniformly slanted steps which may transform propagation directions from −x to ~z depending on the slope angle. Functions such as focusing, redirection, diffusion, and so on may be provided by one or more external films, which can include diffusers and Fresnel lenses, but may be provided by design of the extraction feature profiles.

In one embodiment, the extraction features may substantially focus the principal rays of the system onto the viewing plane which may avoid the use of any extra films barring minor diffusers. The principal rays of the system may be the rays that are substantially central to the optical ray set at any position in the system. For example, light propagating from a physically small LED source at one end of an optical valve may provide a fan of principal rays in the xy plane which may propagate toward the end reflector. On reflection from the end reflector, these rays may propagate back in the xy plane with modified angles to provide convergence, collimation, or divergence as shown in FIGS. 19A, 19B, and 19C. FIGS. 19A, 19B, and 19C are schematic diagrams illustrating light imaging options provided by the curved reflective side.

Converging principal rays, such as those shown in FIG. 19A, may move away from the edges and may fail to illuminate the optical valve surface area, but may enable substantial horizontal localization of extracted rays in the viewing plane with substantially linear extraction features. Uniform illumination of a display may then entail including a horizontal over sizing of the waveguide. Diverging rays, such as those depicted in FIG. 19C may be redirected to provide light to local eye pupils but substantially fill the desired illuminating area even from off axis LEDs. The more divergent the rays, the less bright the illuminator may be since light may be optically lost to the edges of the optical valve. Near collimated propagating principal rays, such as depicted FIG. 19B may achieve an appropriate compromise.

The embodiment of FIG. 20 is provided as an example and not of limitation and assumes an illuminating area of approximately 150×200 mm for x and y dimensions. Additionally, calculations assume the coordinate origin to be approximately centered in the middle of the display area as shown in FIG. 20.

The curvature and slope of the extraction features which may be used to focus collimated principal rays to a point in the plane of the viewer may be derived from the construction illustrated in FIG. 20. The collimated rays may propagate back along the x-axis with the propagation vector, $$ki = \begin{pmatrix} -1 \\ 0 \\ 0 \end{pmatrix}$$

before encountering an extraction feature at position (x,y). The face of the extraction feature at this point has a surface normal vector n(x,y) such that reflected light may travel substantially directly toward a focus point (0,0,V) with a normalized propagation vector:

$$ko = \frac{1}{\sqrt{x^2 + y^2 + V^2}} \cdot \begin{pmatrix} -x \\ -y \\ -V \end{pmatrix}$$

V is the product of the viewing distance which may be approximately 500 mm and the refractive index which may be approximately 1.5 of the waveguide. In this example V may be approximately 750 mm.

The laws of reflection may indicate that the surface normal n(x,y) that deflects a light ray propagating with ki into one with ko is approximately:

$$n(x, y) = \frac{ko - ki}{|ko - ki|}$$

$$= \frac{\frac{1}{\sqrt{x^2 + y^2 + V^2}} \begin{pmatrix} -x \\ -y \\ V \end{pmatrix} \begin{pmatrix} -1 \\ 0 \\ 0 \end{pmatrix}}{\left| \frac{1}{\sqrt{x^2 + y^2 + V^2}} \begin{pmatrix} -x \\ -y \\ V \end{pmatrix} \begin{pmatrix} -1 \\ 0 \\ 0 \end{pmatrix} \right|}$$

A continuous extraction feature curve may follow a path in the xy plane which may be orthogonal to its face normal. Mathematically:

$$\begin{pmatrix} dx \\ dy \\ 0 \end{pmatrix} \cdot n(x, y) = 0$$

in which dx and dy may be infinitesimally small shifts along the curve. Evaluating this expression may yield the local gradient of the curve in the xy plane:

$$\frac{dx}{dy} = \frac{y}{\left( \sqrt{x^2 + y^2 + V^2} - x \right)}$$

FIG. 27 shows extraction feature curves x(x0, y) from the center of the guide, y=0, to the edge, y=100 mm, that may be derived from the local gradient equation above. Complete curves covering negative values of y may not be employed as the curve may be even about the y-axis from physical symmetry.

The surface normal of an extraction feature, n, may be described by its tilt angle with respect to the xy plane as the surface normal orientation in the same xy plane may be determined by the curvature of the extraction feature. The surface tilt angle θ from the z-axis may be given by:

$$\theta = a\cos(n \cdot k)$$

in which k may be the conventional z-axis direction vector.

In one embodiment, for which n is set forth above:

$$\theta(x0, y) = a\cos\left[ \frac{\frac{1}{\sqrt{x(x0, y)^2 + y^2 + V^2}} \cdot \begin{pmatrix} -x(x0, y) \\ -y \\ V \end{pmatrix} - \begin{pmatrix} -1 \\ 0 \\ 0 \end{pmatrix}}{\left| \frac{1}{\sqrt{x(x0, y)^2 + y^2 + V^2}} \begin{pmatrix} -x(x0, y) \\ -y \\ V \end{pmatrix} - \begin{pmatrix} -1 \\ 0 \\ 0 \end{pmatrix} \right|} \cdot \begin{pmatrix} 0 \\ 0 \\ 1 \end{pmatrix} \right]$$

Figure 28:
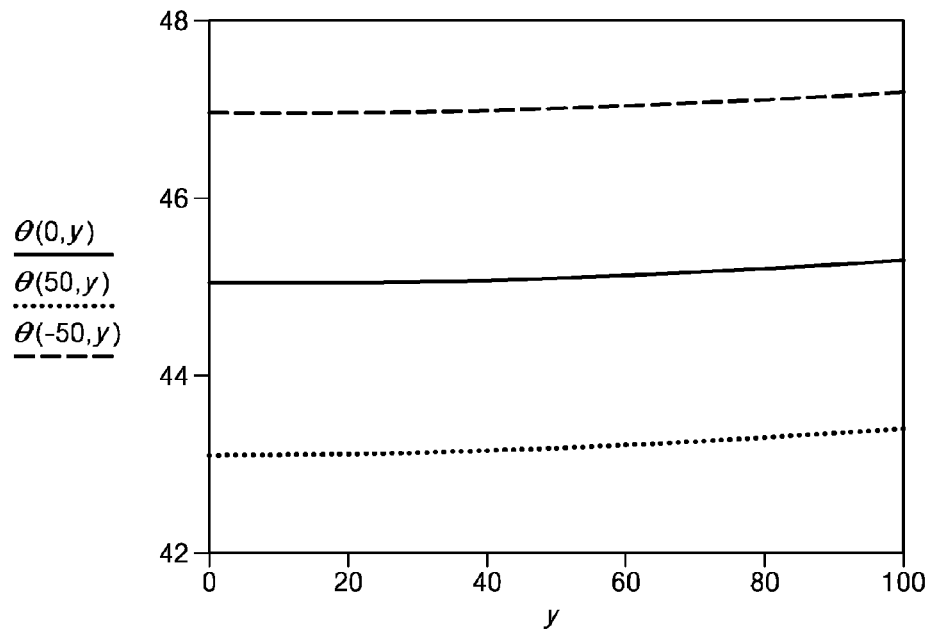
FIG. 28 is a graph illustrating the tilt angle away from the z-axis of the reflecting facet of the extraction feature as a function of y-position along a feature, in accordance with the present disclosure.

FIG. 28 shows tilt angles for three extraction features approximately centered at x=−50, 0 and 50 mm.

Figure 29:
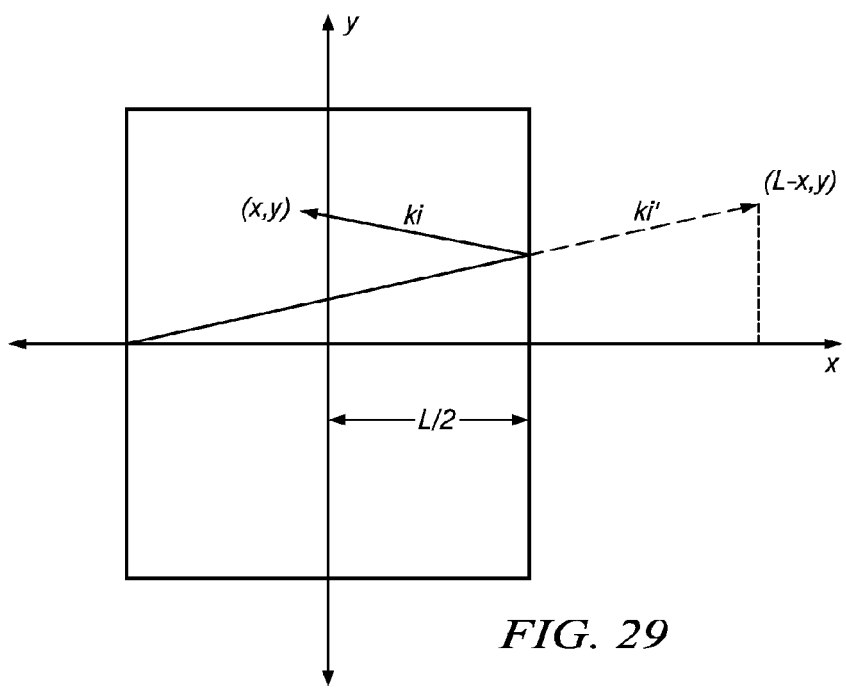
FIG. 29 illustrates divergent light propagation from a planar end surface, in accordance with the present disclosure.

In another embodiment, a design may focus diverging propagating principal rays. In one example, the design may not have a curved end surface. In this embodiment, a planar silvered surface may reflect light and may substantially maintain the divergence in the xy plane of the original LED emission. Advantages may include ease of manufacture, less area wasted to the incomplete illumination under any curve sag and the ability to populate the entrance edge with LED sources for greater angular deflection and substantially uniform '2D-like' performance when all sources are turned on. FIG. 29 illustrates divergent light propagation from a planar end surface. The geometry shown in FIG. 29 may give the principal light ray propagation ki at any position (x,y) as:

$$ki = \begin{pmatrix} x - L \\ y \end{pmatrix}$$

in which L may be the x-dimension of the optical valve. In this embodiment, L is approximately 150 mm.

Continuing from the analysis above, the local gradient of the extractor curve in this case may become:

$$\frac{dx}{dy} = \frac{y \cdot \left[ \frac{1}{\sqrt{x^2 + y^2 + V^2}} + \frac{1}{\sqrt{(x-L)^2 + y^2}} \right]}{L \cdot \frac{1}{\sqrt{(x-L)^2 + y^2}} - x \cdot \left[ \frac{1}{\sqrt{x^2 + y^2 + V^2}} + \frac{1}{\sqrt{(x-L)^2 + y^2}} \right]}$$

Again, a curve profile x(x0,y) can be derived for curves intercepting the x-axis at x0.

The extractor facet normal with respect to the z-axis may then be:

$$\theta(x0, y) = a\cos\left[ \frac{V}{\left| \begin{pmatrix} -x(x0, y) \\ -y \\ V \end{pmatrix} - \frac{\sqrt{x(x0, y)^2 + y^2 + V^2}}{\sqrt{(x(x0, y) - L)^2 + y^2}} \cdot \begin{bmatrix} (x(x0, y) - L) \\ y \\ 0 \end{bmatrix} \right|} \right]$$

Figure 30A:
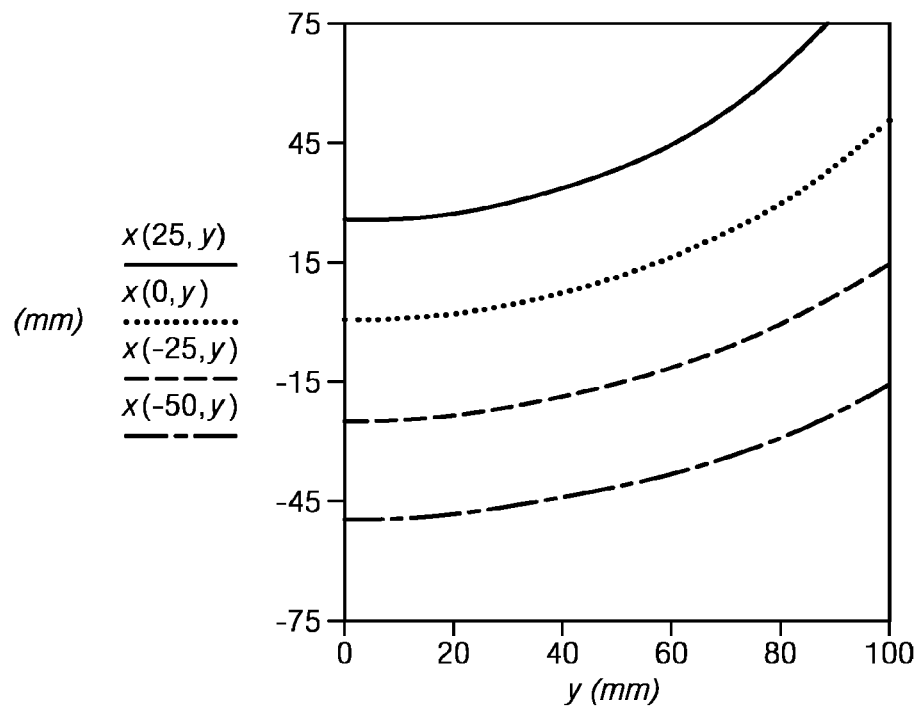
FIG. 30A is a graph illustrating extractor curves and facet angles for a divergent optical valve with a planar top surface, in accordance with the present disclosure.
Figure 30B:
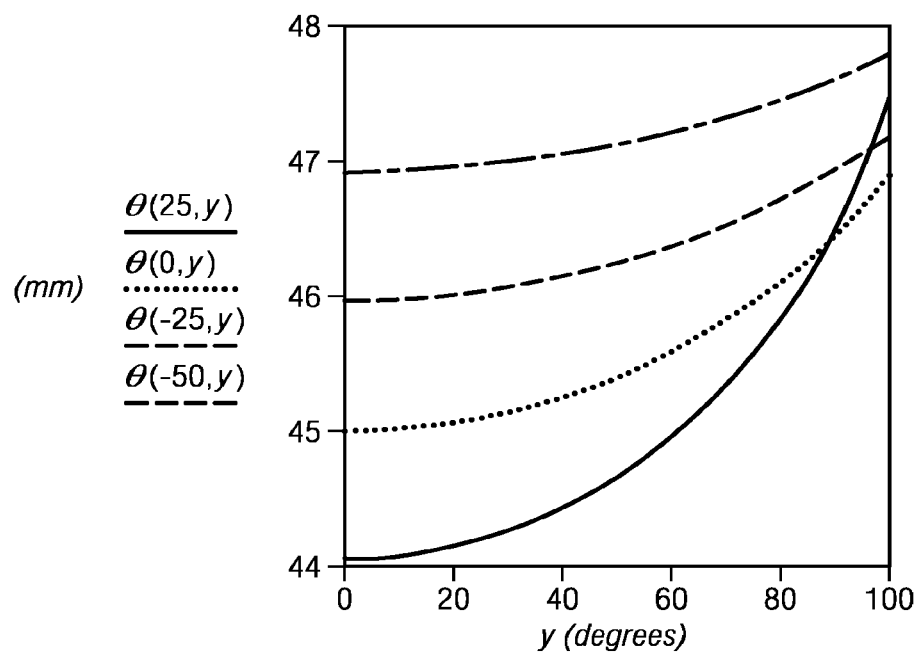
FIG. 30B is a graph illustrating extractor curves and facet angles for a divergent optical valve with a planar top surface, in accordance with the present disclosure.

Derived extractor profiles and surface tilt values are illustrated in FIGS. 30A and 30B.

The embodiments described herein may direct light emitted by an on-axis source toward a single point in the plane of the viewer. These designs may be further optimized to accommodate a plurality of sources using optical design packages such as Zemax, FRED, ASAP, and so forth.

Figure 31:
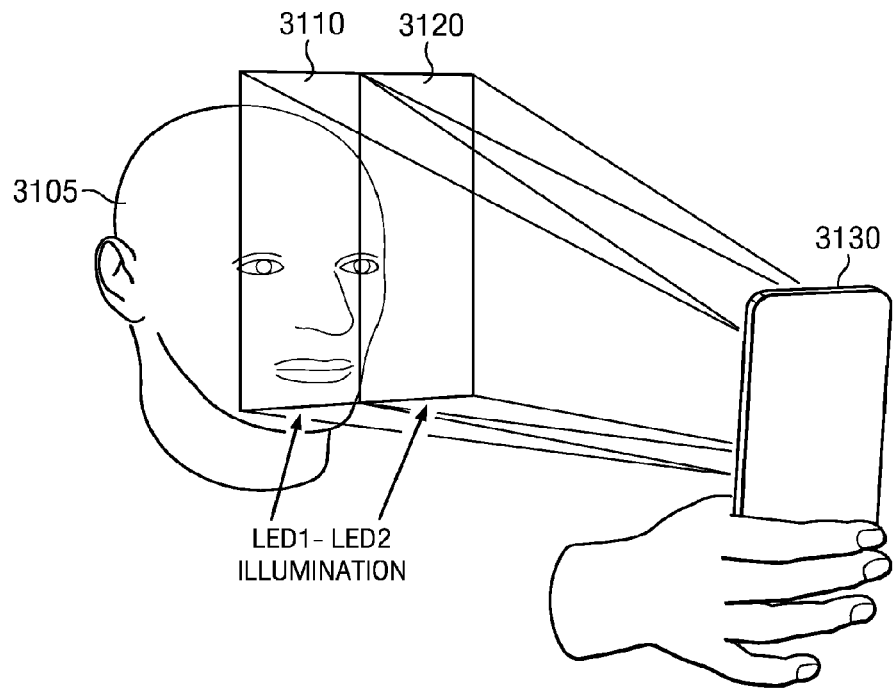
FIG. 31 is a schematic diagram of a stereoscopic display embodiment illustrating how right and left eye images are displayed in synchronization with first and second illumination sources respectively, in accordance with the present disclosure.

FIG. 31 is a schematic diagram of a stereoscopic display system employing a controlled backlight. FIG. 31 includes a viewer 3105, a right eye image 3110, a left eye image 3120, and a display system 3130. In FIG. 31, right and left eye images 3110 and 3105 may be displayed in substantial synchronization with first and second illumination sources, respectively, such as LEDs. Additionally, the display system 3130 and displays as discussed herein, may be various types of devices including, but not limited, a cell phone, smart phone, PDA, gaming system, notebook, laptop, television systems, displays, and so forth. In the example of FIG. 31, two LEDs can each provide an exit pupil or light box that may be aligned by the viewer to illuminate each eye separately. Modulating the LEDs in substantial synchronization with the display system 3130 that provides alternate left and right eye stereoscopic images may allow 3D viewing. The material cost of the display unit may be comparable to that of a 2D display. Additionally, the efficiency of the display system 3130 in 2D mode or when the display may be conventionally updated, may be significantly improved since light may not be wasted illuminating regions away from the eyes of the viewer 3105.

Figure 32:
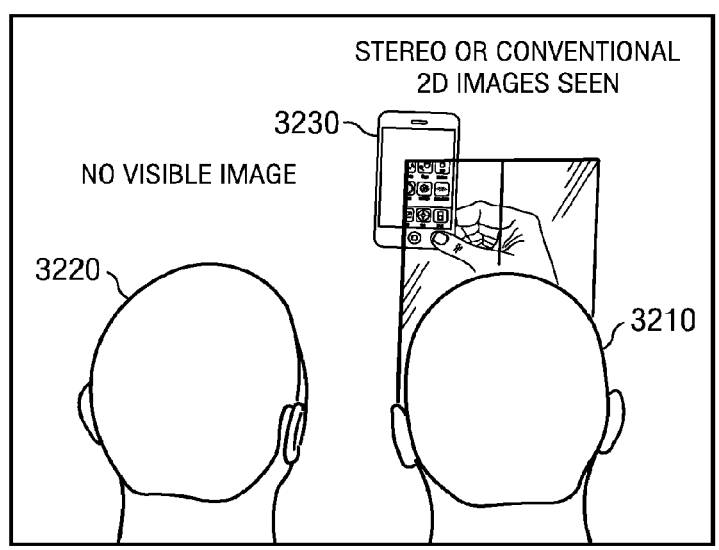
FIG. 32 is a schematic diagram of a display embodiment illustrating how images may be selectively presented to a user, while not presented to others, in accordance with the present disclosure.

FIG. 32 is a schematic diagram of a display embodiment illustrating how images may be selectively presented to a user, while not presented to others. FIG. 32 includes a first viewer 3210, a second viewer 3220, and a display 3230. In the embodiment of FIG. 32, the display 3230 may provide privacy since others may not be able to view the display 3230 where substantially no illumination light exists. In the example of FIG. 32, a first viewer 3210 may be able to view stereo or conventional 2D images, while a second viewer 3220 in a different position, such as an adjacent seat when using public transport, may be unable to view the content on the display 3230 that the first viewer 3210 may view.

Introducing two or more LEDs may provide multiple eyeboxes, freeing up head and/or device movement and may provide for a multiple viewer option. The position of viewers' eyes can be obtained, in one example, using an inboard, out facing CCD detector, which may be commonly found on hand held devices and laptops. These two system functions are described diagrammatically in FIG. 33 and FIG. 34.

Figure 33:
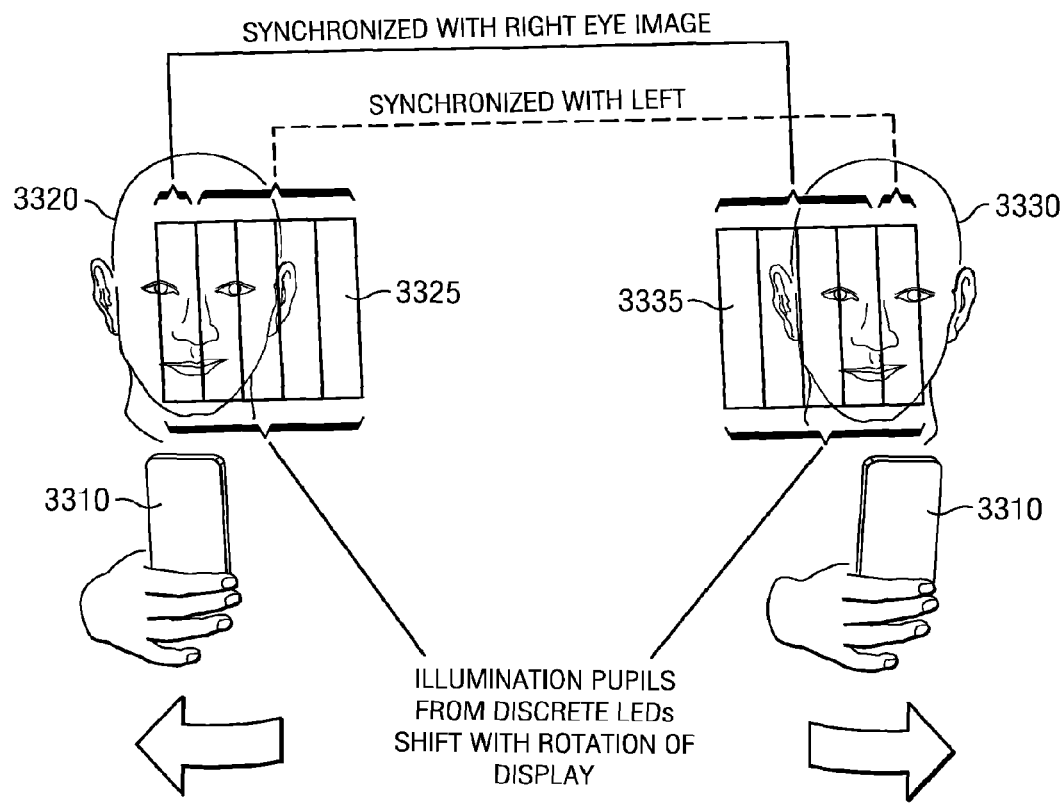
FIG. 33 is a schematic diagram illustrating how device and head or eye position detected by an onboard device may provide inputs to a control system that substantially automatically synchronizes the display of left and right eye images on an autostereoscopic display, in accordance with the present disclosure.

FIG. 33 is a schematic diagram showing how device and head or eye position may be detected by an onboard device. FIG. 33 includes a device 3310, a first orientation 3320, a second orientation 3330, a first set of illumination pupils 3325, and a second set of illumination pupils 3335. As shown in FIG. 33, the first set of illumination pupils 3325 may include images that may be synchronized with the right eye and also images that may be synchronized with the left eye. In the case the device 3310 may be located at a first orientation 3320, the first set of illumination pupils 3325 may include fewer images that may be synchronized with the right eye and more images that may be synchronized with the left eye. Similarly, in the other case shown in FIG. 33, the device 3310 may located be at a second orientation 3330, and the second set of illumination pupils 3335 may include fewer images that may be synchronized with the left eye and more images that may be synchronized with the right eye.

Continuing the discussion of FIG. 33, the onboard device may be a CCD camera and may provide inputs to a control system that automatically, substantially synchronizes the display of left and right eye images on an autostereoscopic display 3310. LED synchronization may be determined by eye tracking inputs using an on-board CCD camera. In the example of FIG. 33, device and/or head position inputs may be provided to a control system that controls multiple LED illuminators which may be substantially synchronized with alternately displayed left and right eye images. Additionally, stereoscopic images may be altered in accordance with viewing angle to achieve motion parallax without increased display bandwidth.

Figure 34:
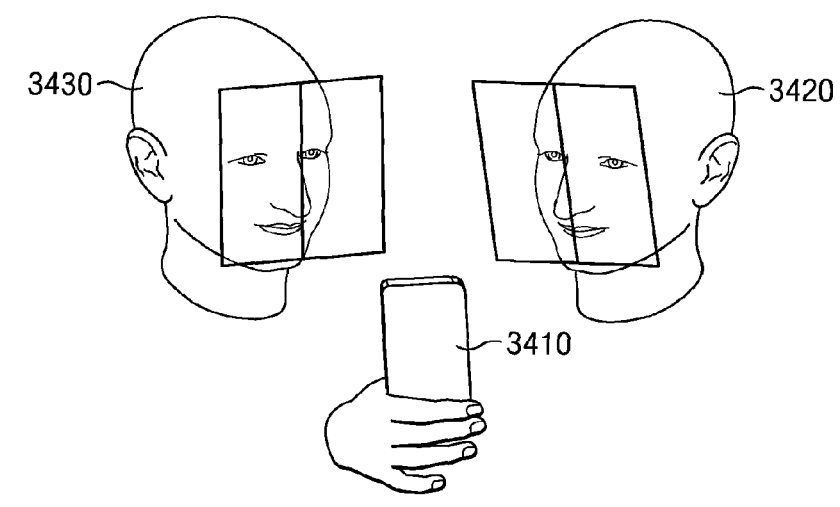
FIG. 34 is a schematic diagram showing how multiple viewer stereoscopic viewing may be provided using detectors to locate the position of eyes and thereby synchronize illuminating LEDs for the left and right eye views, in accordance with the present disclosure.

FIG. 34 is a schematic diagram showing how multiple viewer stereoscopic viewing may be provided using detectors to locate the position of eyes and thereby substantially synchronize illuminating LEDs for the left and right eye views. FIG. 34 includes a device 3410, a first viewer 3420, and a second viewer 3430. As illustrated in FIG. 34, the device 3410 may be in one location with at least a first viewer 3420 and a second viewer 3430 viewing the device 3410. In this example, a CCD camera, which may be located in the device 3410, may locate the eye positions of the viewers 3420 and 3430. Continuing the example of FIG. 34, a controller may then control the illuminating LEDs in the device 3410 to provide the left eye view via the optical valve in particular directions toward the left eye of the first viewer 3420 and the left of the second viewer 3430. Additionally, the right eye view may be provided via the optical valve in another particular direction toward the right eye of the first viewer 3420 and the right eye of the second viewer 3430. Although only two viewers are included in FIG. 34, more viewers may view the device 3410 and two viewers were used for discussion purposes only and not for limitation.

Although the described system embodiments have assumed a handheld mobile platform, such examples should not be considered limiting. This controlled illumination approach can apply to small and large LCD platforms alike, including laptop, television applications, and so forth.

As may be used herein, the terms "substantially" and "approximately" provide an industry-accepted tolerance for its corresponding term and/or relativity between items. Such an industry-accepted tolerance ranges from less than one percent to ten percent and corresponds to, but is not limited to, component values, angles, et cetera. Such relativity between items ranges between less than one percent to ten percent While various embodiments in accordance with the principles disclosed herein have been described above, it should be understood that they have been presented by way of example only, and not limitation. Thus, the breadth and scope of the embodiment(s) should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically and by way of example, although the headings refer to a "Technical Field," the claims should not be limited by the language chosen under this heading to describe the so-called field. Further, a description of a technology in the "Background" is not to be construed as an admission that certain technology is prior art to any embodiment(s) in this disclosure. Neither is the "Summary" to be considered as a characterization of the embodiment(s) set forth in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure, but should not be constrained by the headings set forth herein.

The invention claimed is:

1. An optical display, comprising:
a light valve, comprising:
a first end at which light may enter the light valve and propagate in a first direction;
a second end that is a reflective surface arranged to redirect light propagating in said first direction to propagate in a second direction back toward the first end, wherein the second end is a concave, curved reflective surface, or a Fresnel equivalent of a concave, curved reflective surface;
a first light guiding surface extending between the first and second ends, wherein the first light guiding surface is substantially planar; and
a second light guiding surface, extending between the first and second ends opposite the first light guiding surface, further comprising a plurality of guiding features and a plurality of elongate extraction features that have a variably sloped cross-sectional profile and are curved along the direction in which they are elongated, wherein the extraction features and the guiding features are connected to and alternate with one another respectively, further wherein the plurality of extraction features allow light to pass substantially without loss when the light is propagating in said first direction and further wherein the variably sloped cross-sectional profile of the extraction features allow light to reflect and exit the light valve through the first guide surface towards a viewing plane when the light is propagating in said second direction and further wherein the curvature of the extraction features along the direction in which the extraction features are elongated causes the light from a plurality of illumination elements to be focused, whereby the variably sloped cross-sectional profile and the curvature of the extraction features and the curvature of the reflective end cooperate to direct focused light into respective viewing windows in the viewing plane, and further wherein the plurality of illumination elements are configured to provide light into the light valve; and
a transmissive spatial light modulator arranged to be illuminated by the light valve; and
an illuminator controller for controlling the illumination elements.

2. An optical display according to claim 1, wherein the plurality of illumination elements are an addressable array of LEDs.

3. An optical display according to claim 1, further comprising a sensor for detecting a position of an observer in the proximity of viewing windows of the light valve.

4. An optical display according to claim 3, wherein the illuminator controller is arranged to control the illumination elements depending on the position of the observer detected by the sensor.

5. An optical display according to claim 1, being an observer tracking autostereoscopic display wherein the illuminator controller is arranged to control the a first set of illumination elements corresponding to a first viewing window to provide light in a first illumination phase, and to control a second set of illumination elements corresponding to a second viewing window to provide light in a second illumination phase.

6. An optical display according to claim 5, wherein the first illumination phase corresponds to a left eye image on a display, and the second illumination phase corresponds to a right eye image on the display.

7. An optical display according to claim 1, wherein the second light guiding surface has a stepped structure comprising of the plurality of elongate extraction features, and the plurality of guiding features connecting respective extraction features.

8. An optical display according to claim 1, wherein the extraction features allow light to exit the light valve through the first light guiding surface.

9. An optical display according to claim 1, wherein the light valve is arranged to direct light entering the light valve from illumination elements into viewing windows.

10. An optical display according to claim 1, further comprising a Fresnel lens located to receive light from first light guiding surface of the light valve.

11. An optical display according to claim 1, further comprising a vertical diffuser located to receive light from the first light guiding surface of the light valve.

12. An optical display according to claim 11, wherein the vertical diffuser comprises an asymmetric scattering surface.

13. An optical display according to claim 1, wherein the first end is thinner than the second end.

14. A directional display comprising:
a light valve for guiding light;
an array of illumination elements configured to input light into the light valve in a first direction,
the light valve comprising:
a first light guiding surface;
a second light guiding surface, opposite the first light guiding surface; and
a reflective end arranged to redirect light propagating in said first direction back through the light valve in a second direction, wherein the reflective end is a concave, curved reflective surface, or a Fresnel equivalent of a concave, curved reflective surface,
the second light guiding surface comprising a plurality of guiding features and a plurality of elongate extraction features that have a variably sloped cross-sectional profile and are curved along the direction in which they are elongated, wherein the extraction features and the guiding features are connected to and alternate with one another respectively, wherein the plurality of extraction features allow light to pass substantially without loss when the light is propagating in the first direction, and further wherein the variably sloped cross-sectional profile of the extraction features allow light to reflect and exit the light valve through the first guide surface towards a viewing plane when the light is propagating in the second direction, and wherein the curvature of the extraction features along the direction in which the extraction features are elongated causes the light from the illumination elements to be focused, whereby the variably sloped cross-sectional profile and the curvature of the extraction features and the curvature of the reflective end cooperate to direct focused light into respective viewing windows in the viewing plane;
a transmissive spatial light modulator arranged to be illuminated by the light exiting the light valve; and
an illuminator controller arranged to control which illumination elements are illuminated.

* * * * *